United States Patent
Yamamoto et al.

(10) Patent No.: US 9,435,009 B2
(45) Date of Patent: Sep. 6, 2016

(54) METHOD AND SYSTEM FOR SEPARATING RARE EARTH ELEMENTS

(71) Applicant: Hitachi Metals, Ltd., Minato-ku, Tokyo (JP)

(72) Inventors: Hiroki Yamamoto, Tokyo (JP); Katsuyoshi Furusawa, Tokyo (JP); Hiroyuki Hoshi, Tokyo (JP); Atsushi Kikugawa, Tokyo (JP); Motoyuki Miyata, Tokyo (JP); Hajime Murakami, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 61 days.

(21) Appl. No.: 14/422,796

(22) PCT Filed: Oct. 8, 2013

(86) PCT No.: PCT/JP2013/077303
§ 371 (c)(1),
(2) Date: Feb. 20, 2015

(87) PCT Pub. No.: WO2014/057922
PCT Pub. Date: Apr. 17, 2014

(65) Prior Publication Data
US 2015/0292059 A1  Oct. 15, 2015

(30) Foreign Application Priority Data

Oct. 10, 2012 (JP) .................................. 2012-225110
Oct. 10, 2012 (JP) .................................. 2012-225120
Aug. 1, 2013 (JP) .................................. 2013-160348

(51) Int. Cl.
| | | |
|---|---|---|
| C22B 59/00 | (2006.01) | |
| C22B 3/26 | (2006.01) | |
| C22B 7/00 | (2006.01) | |
| B09B 3/00 | (2006.01) | |
| B01J 19/24 | (2006.01) | |
| B09B 5/00 | (2006.01) | |

(52) U.S. Cl.
CPC .............. *C22B 59/00* (2013.01); *B01J 19/245* (2013.01); *B09B 3/0016* (2013.01); *B09B 3/0083* (2013.01); *B09B 5/00* (2013.01); *C22B 3/0005* (2013.01); *C22B 7/007* (2013.01); *B01J 2219/00245* (2013.01); *B01J 2219/24* (2013.01); *Y02P 10/234* (2015.11)

(58) Field of Classification Search
None
See application file for complete search history.

(56) References Cited

U.S. PATENT DOCUMENTS

| | | | | |
|---|---|---|---|---|
| 3,102,783 A | * | 9/1963 | Peltier | ..................... C22B 59/00 423/21.1 |
| 4,680,055 A | * | 7/1987 | Sharma | ................... C22B 59/00 423/497 |
| 2014/0356258 A1 | | 12/2014 | Miyata et al. | |

FOREIGN PATENT DOCUMENTS

| | | |
|---|---|---|
| JP | 2001-303149 A | 10/2001 |
| JP | 2003-73754 A | 3/2003 |
| JP | 2012-41588 A | 3/2012 |
| WO | WO 2012/137727 A1 | 10/2012 |
| WO | WO 2013/103099 A1 | 7/2013 |

OTHER PUBLICATIONS

International Search Report dated Jan. 21, 2014 with English translation (five (5) pages).
Itoh et al., "Novel rare earth recovery process on Nd—Fe—B magnet scrap by selective chlorination using $NH_4Cl$," Journal of Alloys and Compounds, 2009, pp. 484-487, vol. 477, No. 1-2 (four (4) pages).
Itoh et al., "Extraction of Rare Earth Elements from Nd—Fe—B Magnet Scraps by $NH_4Cl$," Chemistry Letters, 2008, pp. 372-373, vol. 37, No. 3 (two (2) pages).

* cited by examiner

*Primary Examiner* — Steven Bos
(74) *Attorney, Agent, or Firm* — Crowell & Moring LLP

(57) ABSTRACT

An objective of the invention is to provide a method and system for separating a particular rare earth element from a rare earth magnet at a high separation ratio and by a simple process. There is provided a rare earth separation method for separating a first and a second groups of rare earth elements contained in a magnet, the method including: a starting powder preparation step from the magnet; a magnet component oxidation heat treatment step; a rare earth oxide separation step from the magnet components oxide powder; a powder size optimization step; a chlorinating agent mixing step; a chlorination/oxychlorination heat treatment step of forming a "first group rare earth chlorides"/"second group rare earth oxychlorides" mixture; a selective dissolution step of selectively dissolving the first group rare earth chlorides in the solvent and leaving the second group rare earth oxychlorides undissolved in solid phase form; and a solid-liquid separation step.

33 Claims, 11 Drawing Sheets

METHOD AND SYSTEM FOR SEPARATING RARE EARTH ELEMENTS

TECHNICAL FIELD OF THE INVENTION

The present invention relates to technologies of rare earth elements separation, and particularly to a method and system for separating rare earth elements contained in a rare earth magnet.

DESCRIPTION OF BACKGROUND ART

With today's increasing recognition of sustainable global environmental protection, industrial or transportation systems consuming less fossil fuels than conventional or current systems are being actively developed. Examples of such environmentally friendly systems or products are wind turbine generator systems, railroad systems, hybrid cars, electric vehicles and energy efficient air conditioners.

One of the most important devices used in such environmentally friendly systems or products is a high-efficiency rotary electric machine (such as a motor and a generator). In order to manufacture such high-efficiency rotary electric machines, magnets containing rare earth elements (known as rare earth magnets) are widely used. For example, rare earth magnets used in rotary electric machines as drive motors for hybrid vehicles and in rotary electric machines as compressors for air conditioners are required to have a high coercive force even in a high-temperature environment (e.g., approx. 150° C.). Rare earth magnets achieving such a high coercive force contains expensive heavy rare earth elements (such as dysprosium) besides neodymium, iron and boron. Thus, rare earth magnets are now vital for state-of-the-art systems and are expected to have growing demand in the future.

Unfortunately, it is very difficult to recycle (extract and concentrate) a particular rare earth element at low cost. Accordingly, techniques of reducing the use of such rare earth elements while maintaining magnet performance or developments of alternative materials are being urgently studied. However, such techniques are still far from realization. Therefore, immediately important are recycling techniques for extracting rare earth elements from rare earth magnet scraps (such as wasted motors and magnet sludge (cutting scrap) generated during magnet manufacture), and separating and recovering them.

For example, Patent Literature 1 discloses a method for separating rare earth elements, the method including: forming a rare earth halide mixture of divalent rare earth halides and trivalent rare earth halides by halogenating several rare earth elements and/or rare earth compounds in a mixture material, wherein the average valence of two or more rare earth halides in the rare earth halide mixture is from 2 to 3 and the rare earth halide mixture is in a state not dissolved in water or an organic solvent; and then separating the rare earth elements in the rare earth halide mixture into at least two groups by utilizing a property difference between the divalent rare earth halides and the trivalent rare earth halides. According to Patent Literature 1, the separation (ratio) between rare earth elements can be significantly increased compared to conventional methods. Also, when rare earth elements are separated from rare earth concentrates (such as rare earth phosphates), the conventionally essential processing steps (such as acid dissolution, filtration, precipitation removal of impurity, concentration, neutralization and drying) can be spared. Therefore, the separation cost can be considerably reduced.

Patent Literature 2 discloses a method for recovering rare earth elements from a magnet material containing rare earth elements and iron group elements (such as a magnet scrap and magnet sludge), the method including: bringing the magnet material into contact with a gaseous or molten iron chloride; chlorinating only the rare earth elements while not chlorinating the iron group elements; and selectively recovering the rare earth chlorides. According to Patent Literature 2, a lower cost recycle method is provided in which high purity rare earth elements can be extracted from a material (in particular rare earth magnet scraps or sludge) containing rare earth elements and iron group elements and separated from each other.

CITATION LIST

Patent Literature

Patent Literature 1: Japanese Patent Laid-open No. 2001-303149; and
Patent Literature 2: Japanese Patent Laid-open No. 2003-073754.

SUMMARY OF THE INVENTION

Problems to be Solved by the Invention

As described before, with today's growing consciousness of global environmental protection and sustainable natural resource use, rare earth magnets are expected to have growing demand in the future. However, since the production sites of rare earth elements are unevenly distributed, resource supply risk (such as supply and price fluctuation) can arise. In order to hedge against such resource risk, techniques for separating, recovering and recycling rare earth elements are becoming more important than ever.

Previous rare earth element separation/recovery techniques have a high cost problem because rare earth elements are extremely similar in many of the chemical properties to each other. Accordingly, a strong demand exists for low cost techniques for separating a particular rare earth element from a rare earth magnet containing various rare earth elements.

In view of the foregoing, it is an objective of the present invention to provide a method and system for separating a particular rare earth element from a rare earth magnet at a high separation ratio and by a simple process (i.e., at a low cost).

Solution to Problems (I) According to one aspect of the present invention, there is provided a rare earth separation method for separating rare earth elements contained in a magnet including magnet components including a first group of rare earth elements and a second group of rare earth elements, the method including:

a starting powder preparation step of preparing a starting powder from the magnet;

a magnet component oxidation heat treatment step of forming a powder of oxides of the magnet components, the oxides being formed by heating or combustion at a temperature from 300 to 1000° C. in an oxidizing atmosphere;

a rare earth oxide separation step of separating a rare earth oxide powder from the powder of the oxides of the magnet components, the rare earth oxide powder including first group rare earth oxides (=oxides of the first group of rare earth elements) and second group rare earth oxides (=oxides of the second group of rare earth elements);

a powder size optimization step of optimizing the rare earth oxide powder so as to have a desirable powder size distribution;

a chlorinating agent mixing step of mixing the rare earth oxide powder obtained at the powder size optimization step with a chlorinating agent to prepare a "rare earth oxide powder"/"chlorinating agent" mixture;

a chlorination/oxychlorination heat treatment step of forming a "first group rare earth chlorides"/"second group rare earth oxychlorides" mixture including first group rare earth chlorides (=chlorides of the first group of rare earth elements) and second group rare earth oxychlorides (=oxychlorides of the second group of rare earth elements) from the "rare earth oxide powder"/"chlorinating agent" mixture;

a selective dissolution step of introducing the "first group rare earth chlorides"/"second group rare earth oxychlorides" mixture in a solvent in order to selectively dissolve the first group rare earth chlorides in the solvent and leave the second group rare earth oxychlorides undissolved in solid phase form; and a solid-liquid separation step of solid-liquid separating the solvent in which the first group rare earth chlorides are dissolved and the second group rare earth oxychlorides in the solid phase form.

In the above aspect (I) of the invention, the following modifications and changes can be made.

i) The chlorination/oxychlorination heat treatment step includes: a chlorination heat treatment step of chlorinating all of the rare earth oxide powder in the "rare earth oxide powder"/"chlorinating agent" mixture to obtain rare earth chlorides including the first group rare earth chlorides and second group rare earth chlorides (=chlorides of the second group of rare earth elements); and a selective oxychlorination heat treatment step of oxychlorinating only the second group rare earth chlorides to form the "first group rare earth chlorides"/"second group rare earth oxychlorides" mixture, wherein the chlorination heat treatment step is performed at a temperature at which all of the rare earth oxide powder can be chlorinated and lower than vaporization temperatures of the rare earth chlorides in a non-oxidizing atmosphere; and the selective oxychlorination heat treatment step is performed at an optimal temperature in an oxidizing atmosphere.

ii) The chlorinating agent is ammonium chloride; and at the optimal temperature of the selective oxychlorination heat treatment step, only the second group rare earth chlorides can be oxychlorinated and the first group rare earth chlorides cannot be oxychlorinated, and the first group rare earth chlorides exhibits a percent weight reduction per unit temperature of $1\times10^{-3}\%/^\circ$ C. or less during the selective oxychlorination heat treatment step as measured by thermogravimetric analysis during elevated temperature process.

iii) The chlorination heat treatment step includes: a first elementary chlorination step of reacting the rare earth oxide powder with ammonium chloride by a heat treatment at an atmospheric pressure to form ammonium chlorides of the rare earth elements; and a successive second elementary chlorination step of forming the rare earth chlorides from the ammonium chlorides of the rare earth elements by a heat treatment at a reduced pressure.

iv) The chlorination/oxychlorination heat treatment step is a simultaneous selective-chlorination/selective-oxychlorination heat treatment step of simultaneously forming the "first group rare earth chlorides"/"second group rare earth oxychlorides" from the "rare earth oxide powder"/"chlorinating agent" mixture all at once by a heat treatment at an optimal temperature in a non-oxidizing atmosphere.

v) The chlorinating agent is ammonium chloride; and at the optimal temperature of the simultaneous selective-chlorination/selective-oxychlorination heat treatment step, only the first group rare earth oxides can be chlorinated and only the second group rare earth oxides can be oxychlorinated.

vi) The simultaneous selective-chlorination/selective-oxychlorination heat treatment step includes: a first step of reacting the first group rare earth oxides with ammonium chloride to form ammonium chlorides of the first group rare earth elements by a heat treatment at an atmospheric pressure; and a successive second step of forming the first group rare earth chlorides from the ammonium chlorides of the first group rare earth elements by a heat treatment at a reduced pressure.

vii) The chlorinating agent is ammonium chloride; and the rare earth oxide powder is mixed with the ammonium chloride in a mixing ratio of 1 mole of the rare earth oxide powder relative to more than 6 moles to less than 20 moles of the ammonium chloride.

viii) The magnet further includes boron and some of the boron remains in the rare earth oxide powder obtained at the rare earth oxide separation step; and the method further includes, between the rare earth oxide separation step and the powder size optimization step, a boron reduction step of reducing the boron remaining in the rare earth oxide powder.

ix) The rare earth separation method further includes, between the powder size optimization step and the chlorinating agent mixing step, an additional oxidation heat treatment step of further and completely oxidizing the rare earth oxide powder obtained at the rare earth oxide separation step, wherein the additional oxidation step is carried out at a temperature higher than the temperature at which the magnet component oxidation heat treatment step is performed in an oxidizing atmosphere.

x) The desirable powder size distribution obtained at the powder size optimization step has a cumulative 50 volume percent (vol. %) powder size of 0.5 μm or larger and a cumulative 90 volume percent (vol. %) powder size of 10 μm or smaller.

xi) The desirable powder size distribution obtained at the powder size optimization step has a cumulative 50 vol. % powder size of 0.04 μm or larger and a cumulative 90 vol. % powder size of 1.5 μm or smaller.

xii) The powder size optimization step includes a first milling step of providing a first desirable powder size distribution and a successive second milling step of providing a second desirable powder size distribution;

the first desirable powder size distribution obtained at the first milling step has a cumulative 50 vol. % powder size of 0.5 μm or larger and a cumulative 90 vol. % powder size of 10 μm or smaller; and the second desirable powder size distribution obtained at the second milling step has a cumulative 50 vol. % powder size of 0.04 μm or larger and a cumulative 90 vol. % powder size of 1.5 μm or smaller.

xiii) The rare earth oxide separation step is carried out by a carbothermal reduction process or a selective acid dissolution process.

xiv) The magnet is a neodymium-iron-boron system magnet, the first group of rare earth elements is neodymium and/or praseodymium, and the second group of rare earth elements is dysprosium.

(II) According to another aspect of the present invention, there is provided a rare earth separation system for separating rare earth elements contained in a magnet including magnet components including a first group of rare earth elements and a second group of rare earth elements, the system including:

a magnet pretreatment section including:

a magnet component oxidation heat treatment unit;

a rare earth oxide separation unit connected with the magnet component oxidation heat treatment unit; and a powder size optimization unit connected with the rare earth oxide separation unit; and a rare earth element separation section including:

a chlorinating agent mixing/supply unit;

a chlorination/oxychlorination heat treatment unit;

an atmosphere control unit;

a waste gas disposal unit; and a chloride/oxychloride separation unit, the chlorinating agent mixing/supply unit being connected with the powder size optimization unit and the chlorination/oxychlorination heat treatment unit, the chlorination/oxychlorination heat treatment unit being connected with the chlorinating agent mixing/supply unit, the atmosphere control unit, the waste gas disposal unit and the chloride/oxychloride separation unit, wherein the magnet component oxidation heat treatment unit forms a powder of the magnet components and oxides the powder to prepare a magnet component oxide powder, wherein the rare earth oxide separation unit separates a rare earth oxide powder containing rare earth oxides including first group rare earth oxides (=oxides of the first group of rare earth elements) and second group rare earth oxides (=oxides of the second group of rare earth elements) from the magnet component oxide powder obtained at the magnet component oxidation heat treatment unit, wherein the powder size optimization unit optimizes the rare earth oxide powder so as to have a desirable powder size distribution, wherein the chlorinating agent mixing/supply unit mixes the rare earth oxide powder whose powder size is optimized at the powder size optimization unit with a chlorinating agent to prepare a "rare earth oxide powder"/"chlorinating agent" mixture and supplies the mixture to the chlorination/oxychlorination heat treatment unit, wherein the chlorination/oxychlorination heat treatment unit performs two types of chlorination/oxychlorination heat treatments:

1) a chlorination/selective-oxychlorination heat treatment including a chlorination heat treatment of firstly chlorinating all the rare earth oxide powder in the "rare earth oxide powder"/"chlorinating agent" mixture to obtain rare earth chlorides including first group rare earth chlorides (=chlorides of the first group of rare earth elements) and second group rare earth chlorides (=chlorides of the second group of rare earth elements), and a selective oxychlorination heat treatment of, successively after the chlorination heat treatment, selectively oxychlorinates only the second group rare earth chlorides to prepare a "first group rare earth chlorides"/"second group rare earth oxychlorides" mixture; or 2) a simultaneous selective-chlorination/selective-oxychlorination heat treatment of simultaneously forming the "first group rare earth chlorides"/"second group rare earth oxychlorides" from the "rare earth oxide powder"/"chlorinating agent" mixture all at once, wherein the chlorination heat treatment in the chlorination/selective-oxychlorination heat treatment is performed at a temperature at which all of the rare earth oxide powder can be chlorinated to form the rare earth chlorides and lower than vaporization temperatures of the rare earth chlorides in a non-oxidizing atmosphere and the selective-oxychlorination heat treatment in the chlorination/selective-oxychlorination heat treatment is performed at an optimal temperature in an oxidizing atmosphere, wherein the simultaneous selective-chlorination/selective-oxychlorination heat treatment is performed at a temperature at which only the first group rare earth oxides can be chlorinated and only the second group rare earth oxides can be oxychlorinated, wherein the atmosphere control unit controls the non-oxidizing atmosphere used in the chlorinating heat treatment, the oxidizing atmosphere used in the selective-oxychlorinating heat treatment, and the non-oxidizing atmosphere used in the simultaneous selective-chlorination/selective-oxychlorination heat treatment, wherein the waste gas disposal unit disposes ammonia gas and hydrogen chloride gas generated by the chlorination heat treatment, chlorine gas generated by the selective-oxychlorination heat treatment, and ammonia gas generated by the simultaneous selective-chlorination/selective-oxychlorination heat treatment, and wherein the chloride/oxychloride separation unit firstly introduces the "first group rare earth chlorides"/"second group rare earth oxychlorides" mixture in a solvent in order to selectively dissolve the first group rare earth chlorides in the solvent and leave the second group rare earth oxychlorides undissolved in solid phase form; and then solid-liquid separates the solvent in which the first group rare earth chlorides are dissolved and the second group rare earth oxychlorides are in solid phase form.

(III) According to still another aspect of the present invention, there is provided a rare earth separation system for separating rare earth elements contained in a magnet including magnet components including a first group of rare earth elements, a second group of rare earth elements and boron, the system including:

a magnet pretreatment section including:

a magnet component oxidation heat treatment unit;

a rare earth oxide separation unit;

a boron reduction unit;

a powder size optimization unit; and an additional oxidation heat treatment unit, the rare earth oxide separation unit being connected with the magnet component oxidation heat treatment unit and the boron reduction unit, the powder size optimization unit being connected with the boron reduction unit and the additional oxidation heat treatment unit; and a rare earth element separation section including:

a chlorinating agent mixing/supply unit;

a chlorination/oxychlorination heat treatment unit;

an atmosphere control unit;

a waste gas disposal unit; and a chloride/oxychloride separation unit, the chlorinating agent mixing/supply unit being connected with the additional oxidation heat treatment unit and the chlorination/oxychlorination heat treatment unit, the chlorination/oxychlorination heat treatment unit being connected with the atmosphere control unit, the waste gas disposal unit and the chloride/oxychloride separation unit, wherein the magnet component oxidation heat treatment unit forms a powder of the magnet components and oxides the powder to prepare a magnet component oxide powder, wherein the rare earth oxide separation unit separates a rare earth oxide powder containing rare earth oxides including first group rare earth oxides and second group rare earth oxides from the magnet component oxide powder obtained at the magnet component oxidation heat treatment unit, wherein the boron reduction unit reduces boron remaining in the rare earth oxide powder separated at the rare earth oxide separation unit, wherein the powder size optimization unit optimizes the rare earth oxide powder so as to have a desirable powder size distribution, wherein the additional oxidation heat treatment unit further and completely oxidizes the rare earth oxide powder whose powder size is optimized at the powder size optimization unit, wherein the chlorinating agent mixing/supply unit mixes the rare earth oxide powder that is further oxidized at the additional oxidation heat treatment unit with a chlorinating agent to prepare a "rare earth oxide powder"/"chlorinating agent" mixture and supplies the mixture to the chlorination/oxychlorination heat treatment unit, wherein the chlorination/oxychlorination heat treatment unit performs two types of chlorination/oxychlorination heat treatments:

1) a chlorination/selective-oxychlorination heat treatment including a chlorination heat treatment of first chlorinating all the rare earth oxide powder in the "rare earth oxide powder"/"chlorinating agent" mixture to obtain rare earth chlorides including first group rare earth chlorides and second group rare earth chlorides, and a selective oxychlorination heat treatment of, successively after the chlorination heat treatment, selectively oxychlorinating only the second group rare earth chlorides to prepare a "first group rare earth chlorides"/"second group rare earth oxychlorides" mixture; or 2) a simultaneous selective-chlorination/selective-oxychlorination heat treatment of simultaneously forming the "first group rare earth chlorides"/"second group rare earth oxychlorides" from the "rare earth oxide powder"/"chlorinating agent" mixture all at once, wherein the chlorination heat treatment in the chlorination/selective-oxychlorination heat treatment is performed at a temperature at which all of the rare earth oxide powder can be chlorinated to form the rare earth chlorides and lower than vaporization temperatures of the rare earth chlorides in a non-oxidizing atmosphere and the selective-oxychlorination heat treatment in the chlorination/selective-oxychlorination heat treatment is performed at an optimal temperature in an oxidizing atmosphere, wherein the simultaneous selective-chlorination/selective-oxychlorination heat treatment is performed at a temperature at which only the first group rare earth oxides can be chlorinated and only the second group rare earth oxides can be oxychlorinated, wherein the atmosphere control unit controls the non-oxidizing atmosphere used in the chlorinating heat treatment, the oxidizing atmosphere used in the selective-oxychlorinating heat treatment, and the non-oxidizing atmosphere used in the simultaneous selective-chlorination/selective-oxychlorination heat treatment, wherein the waste gas disposal unit disposes ammonia gas and hydrogen chloride gas generated by the chlorination heat treatment, chlorine gas generated by the selective-oxychlorination heat treatment, and ammonia gas generated by the simultaneous selective-chlorination/selective-oxychlorination heat treatment, and wherein the chloride/oxychloride separation unit first introduces the "first group rare earth chlorides"/"second group rare earth oxychlorides" mixture in a solvent in order to selectively dissolve the first group rare earth chlorides in the solvent and leave the second group rare earth oxychlorides undissolved in solid phase form; and then solid-liquid separates the solvent in which the first group rare earth chlorides are dissolved and the second group rare earth oxychlorides are in solid phase form.

In the above aspects (II) and (III) of the invention, the following modifications and changes can be made.

xv) The chlorinating agent is ammonium chloride;

the chlorination heat treatment includes a first elementary chlorination heat treatment of reacting the rare earth oxide powder with the ammonium chloride to form ammonium chlorides of the first group of rare earth elements by a heat treatment at an atmospheric pressure controlled by the atmosphere control unit and a successive second elementary chlorination heat treatment of forming the first group rare earth chlorides from the ammonium chlorides of the first group of rare earth elements by a heat treatment at a reduced pressure controlled by the atmosphere control unit; and the oxidizing atmosphere controlled by the atmosphere control unit used in the selective-oxychlorinating heat treatment is an atmosphere, a dry air, or an inert gas/oxygen gas mixture.

xvi) At the optimal temperature of the selective oxychlorination heat treatment, only the second group rare earth chlorides can be oxychlorinated and the first group rare earth chlorides cannot be oxychlorinated, and the first group rare earth chlorides exhibits a percent weight reduction per unit temperature of $1\times10^{-3}$%/° C. or less during the selective oxychlorination heat treatment as measured by thermogravimetric analysis during elevated temperature process.

xvii) The chlorinating agent is ammonium chloride; and the simultaneous selective-chlorination/selective-oxychlorination heat treatment includes a first heat treatment of reacting the rare earth oxide powder with the ammonium chloride to form ammonium chlorides of the first group of rare earth elements by a heat treatment at an atmospheric pressure controlled by the atmosphere control unit and a successive second heat treatment of forming the first group rare earth chlorides from the ammonium chlorides of the first group of rare earth elements by heat treatment at a reduced pressure controlled by the atmosphere control unit.

xviii) The rare earth element separation section further includes, connected between the chlorination/oxychlorination heat treatment unit and the waste gas disposal unit, a chemical reaction monitoring unit including an ammonia gas sensor.

xix) The rare earth element separation section further includes, connected between the chlorination/oxychlorination heat treatment unit and the waste gas disposal unit, a chemical reaction monitoring unit including an ammonia gas sensor for monitoring the chemical reactions performed at the chlorination heat treatment and a chlorine gas sensor for monitoring chemical reactions performed at the selective oxychlorination heat treatment.

xx) The powder size optimization unit includes an agglomerating device and/or a milling device, and further includes a particle size distribution analyzer;

the milling device includes a first milling machine for providing a first desirable powder size distribution and a second milling machine for providing a second desirable powder size distribution;

a cumulative 50 vol. % powder size and a cumulative 90 vol. % powder size of the first desirable powder size distribution obtained by the first milling machine are 0.5 μm or larger and 10 μm or smaller, respectively; and a cumulative 50 vol. % powder size and a cumulative 90 vol. % powder size of the second desirable powder size distribution obtained by the second milling machine are 0.04 µm or larger and 1.5 µm or smaller, respectively.

xxi) The rare earth oxide separation unit includes devices for performing a carbothermal reduction process or devices for performing a selective acid dissolution process.

xxii) The magnet is a neodymium-iron-boron system magnet, the first group of rare earth elements is neodymium and/or praseodymium, and the second group of rare earth elements is dysprosium.

Advantages of the Invention

According to the present invention, it is possible to provide a method and apparatus for separating a particular rare earth element from a rare earth magnet at a high separation ratio and by a simple process (i.e., at a low cost).

DETAILED DESCRIPTION OF THE PREFERRED EMBODIMENTS

In order to achieve a method for simply separating a particular rare earth element from a plurality of rare earth elements contained in a magnet at a high separation ratio, the present inventors have examined in detail individual processing steps of rare earth separation processes. The inventors have particularly focused on and examined in detail chemical reactions (chlorinations and oxychlorinations) for separating rare earth elements from each other. After the detailed examination, the inventors have found the following facts: The behavior of such chemical reactions is different depending on the type of rare earth element. A particular rare earth element can be separated at a high separation ratio by utilizing such behavior differences between the chemical reactions. In order to increase the efficiencies of the chemical reactions, it is important that the particle sizes of the reactant powders used in the chemical reactions need to be optimized so as to fall into a desirable range. The present invention is based on these new findings.

Preferred embodiments of the invention will be described below with reference to the accompanying drawings. However, the invention is not limited to the specific embodiments described below, but various combinations and modifications are possible without departing from the spirit and scope of the invention.

[Method for Separating Rare Earth Elements]

The method for separating rare earth elements according to the invention are broadly divided into two processes: i) a pretreatment process for extracting rare earth elements from a rare earth magnet and preparing an oxide powder of the rare earth elements having an optimal particle size; and ii) a separation process for separating the rare earth elements obtained by the pretreatment process from each other. After the separation process, a recovery process for recovering individual rare earth elements is performed. First, the pretreatment and separation processes will be roughly explained by reference to FIGS. 1 to 3.

Figure 1:
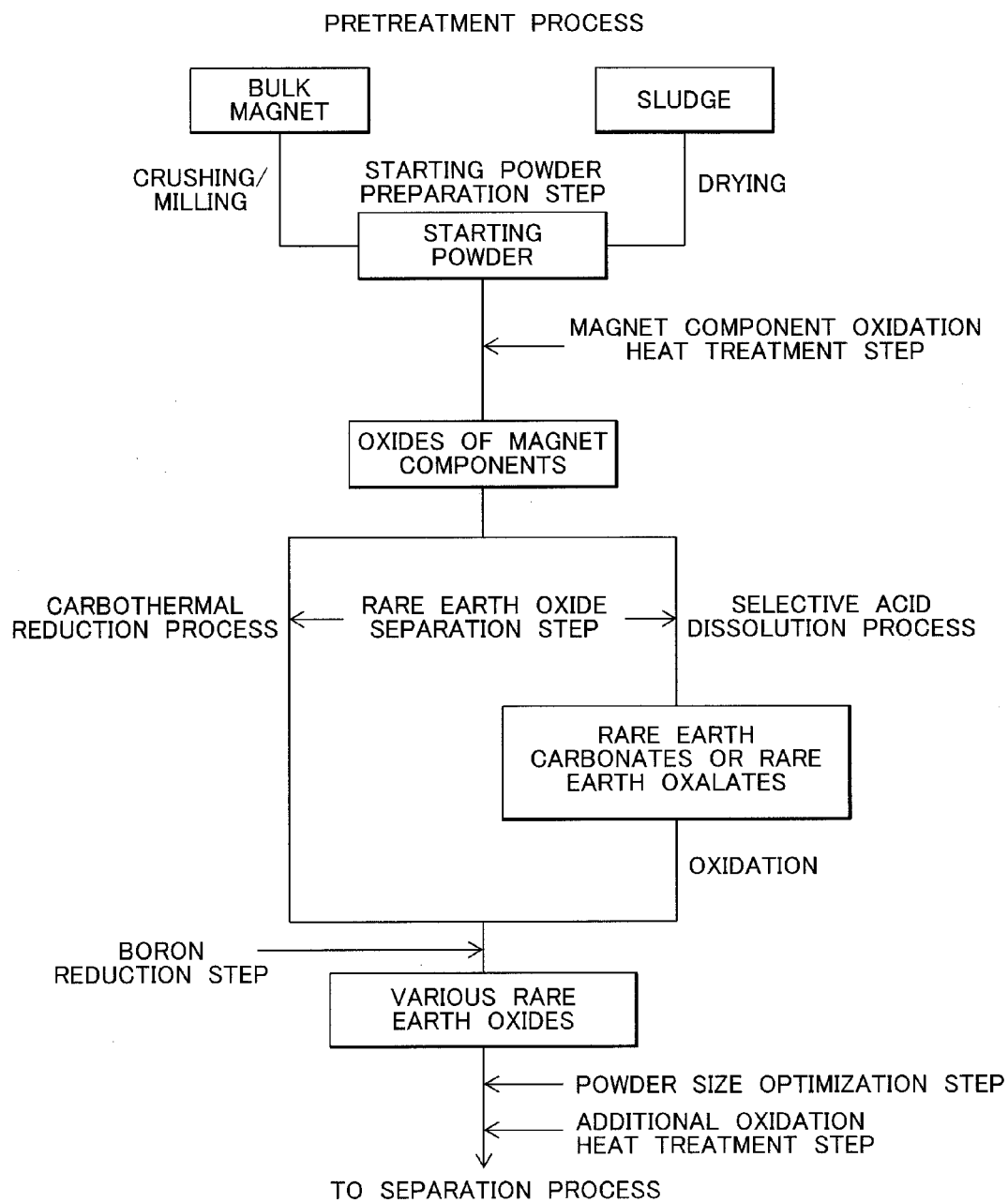
FIG. 1 is a flow chart showing processing steps in a pretreatment process of a rare earth separation method according to the present invention.

FIG. 1 is a flow chart showing processing steps in a pretreatment process of a rare earth separation method according to the present invention. As shown in FIG. 1, first, at a starting powder preparation step, a starting powder is prepared from a rare earth magnet scrap (such as a wasted magnet, a failed magnet and magnet sludge). Next, at a magnet component oxidation heat treatment step, the starting powder is oxidized to form a powder of oxides of the components of the rare earth magnet scrap (an oxide powder of the rare earth magnet scrap components). Then, at a rare earth oxide separation step, a powder containing only rare earth oxides (a rare earth oxide powder) is separated from the thus obtained oxide powder of the rare earth magnet scrap components by a carbothermal reduction process or a selective acid dissolution process.

Rare earth magnets often contain boron. Therefore, the rare earth oxide powder obtained at the rare earth oxide separation step may sometimes contain boron oxides even after the rare earth oxide separation step (boron oxides may sometimes remain in the rare earth oxide powder obtained at the rare earth oxide separation step). In such cases, a procedure for decreasing or eliminating boron is preferably performed at a boron reduction step. When the boron content is small, such a boron reduction step can be spared.

After that, at a powder size optimization step, the separated rare earth oxide powder is optimized (milled or agglomerated/granulated) so as to have a desirable particle size distribution. When the powder is too coarse, first and second milling steps are preferably performed. When the powder is too fine, a particle agglomeration/granulation procedure is preferably performed. Next, at an additional oxidation heat treatment step, the powder size optimized rare earth oxide powder is subjected to an additional oxidation procedure to further (completely) oxidize the rare earth oxide powder. The additional oxidation heat treatment step is not essential for the invention, but is preferably performed. By performing all of the above-described processing steps, a powder of the oxides of the rare earth elements contained in the magnet scrap is obtained and supplied to the subsequent separation process.

Figure 2:
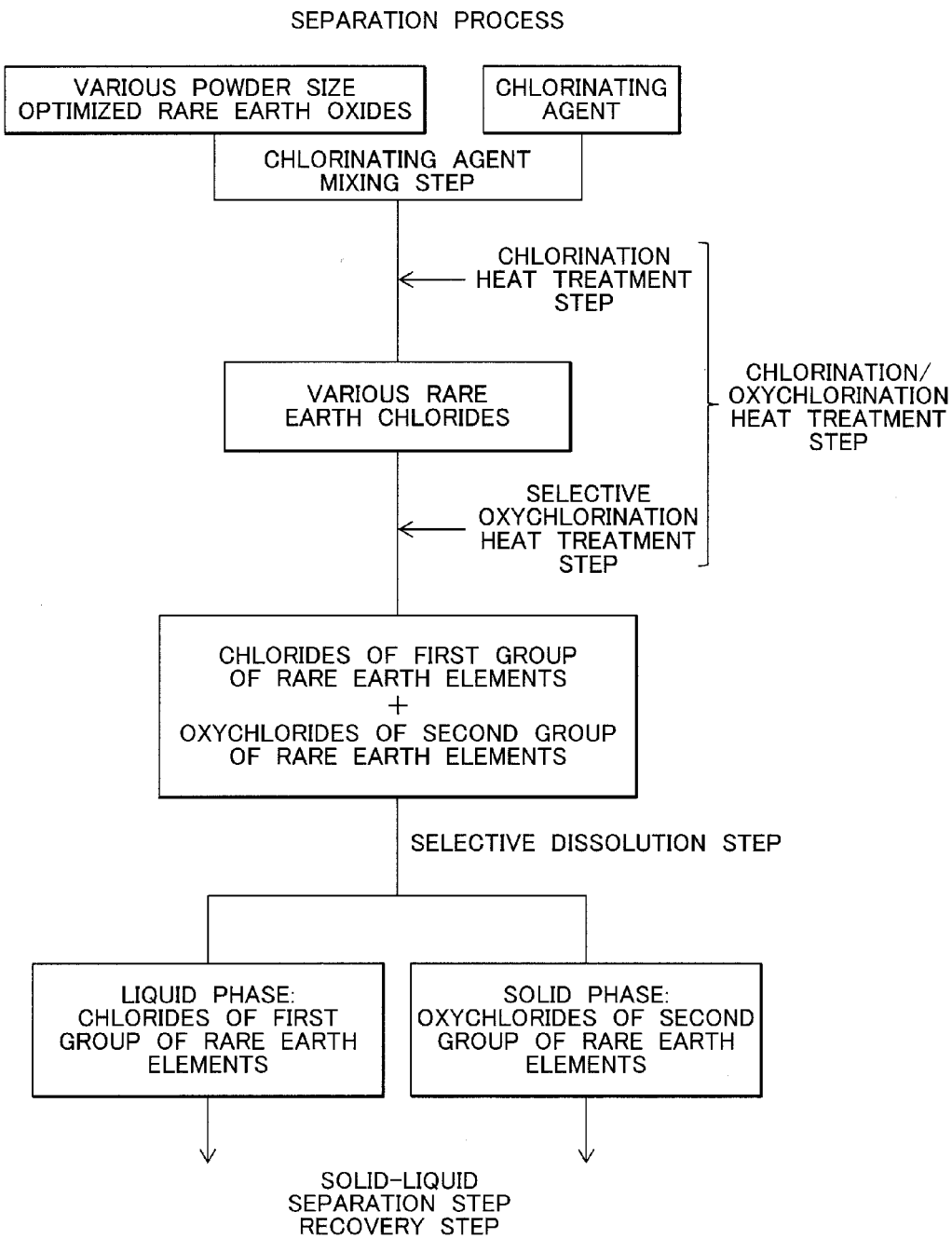
FIG. 2 is a flow chart showing an example of processing steps of a separation process of the rare earth separation method according to the invention.

FIG. 2 is a flow chart showing an example of processing steps of a separation process of the rare earth separation method according to the invention. As shown in FIG. 2, first, at a chlorinating agent mixing step, the rare earth oxide powder (that is obtained at the rare earth oxide separation step and is then subjected to the powder size optimization step and optionally the additional oxidation heat treatment step) is mixed with a chlorinating agent powder to prepare a "rare earth oxide powder"/"chlorinating agent" mixture.

Next, at a chlorination/oxychlorination heat treatment step, the thus prepared "rare earth oxide powder"/"chlorinating agent" mixture is subjected to a chlorination/oxychlorination heat treatment to form a "first group rare earth chlorides"/"second group rare earth oxychlorides" mixture containing chlorides of a first group of rare earth elements and oxychlorides of a second group of rare earth elements. The present invention is most characterized by this chlorination/oxychlorination heat treatment step.

Herein and in the appended claims, a rare earth element in the first group of rare earth elements is sometimes referred to simply as a first group rare earth element; a rare earth element in the second group of rare earth elements is sometimes referred to simply as a second group rare earth element; the oxides of the first group of rare earth elements are sometimes referred to simply as the first group rare earth oxides; the oxides of the second group of rare earth elements are sometimes referred to simply as the second group rare earth oxides; the chlorides of the first group of rare earth elements are sometimes referred to simply as the first group rare earth chlorides; the oxychlorides of the second group of rare earth elements are sometimes referred to simply as the second group rare earth oxychlorides; the compounds of the first group of rare earth elements are sometimes referred to simply as the first group rare earth compounds; the compounds of the second group of rare earth elements are sometimes referred to simply as the second group rare earth compounds; the precipitates of the first group of rare earth elements are sometimes referred to simply as the first group rare earth precipitates; and the precipitates of the second group of rare earth elements are sometimes referred to simply as the second group rare earth precipitates.

The chlorination/oxychlorination heat treatment step shown in FIG. 2 includes: a chlorination heat treatment step for forming rare earth chlorinates from the "rare earth oxide powder"/"chlorinating agent" mixture; and a successive selective-oxychlorination heat treatment step for selectively forming the second group rare earth oxychlorinates from the rare earth chlorinates, thereby forming a "first group rare earth chlorides"/"second group rare earth oxychlorides" mixture. That is, this chlorination/oxychlorination procedure is a two-step heat treatment procedure including the first step of once chlorinating all of the rare earth oxides into rare earth chlorinates and the second step of selectively oxychlorinating a part of the resulting rare earth chlorinates into the "first group rare earth chlorides"/"second group rare earth oxychlorides" mixture. The chlorinating/oxychlorination heat treatment step shown in FIG. 2 is the first type of chlorination/oxychlorination heat treatment step of the invention, and hereinafter referred to as the chlorinating/selective-oxychlorinating heat treatment step.

Next, at a selective dissolution step, the "rare earth chlorides"/"rare earth oxychlorides" mixture is poured into a solvent to selectively dissolve only the first group rare earth chlorides in the solvent and cause the second group rare earth oxychlorides to remain undissolved in the form of a solid phase. Next, the first group rare earth chlorides dissolved in the solvent and the undissolved solid-phase second group rare earth oxychlorides are solid-liquid separated. By the above-described procedure from the chlorinating agent mixing step to the selective dissolution step, the first group of the rare earth elements (in the form of a solution of rare earth chlorides) and the second group of rare earth elements (in the form of undissolved solid-phase rare earth oxychlorides) are separated from each other.

Figure 3:
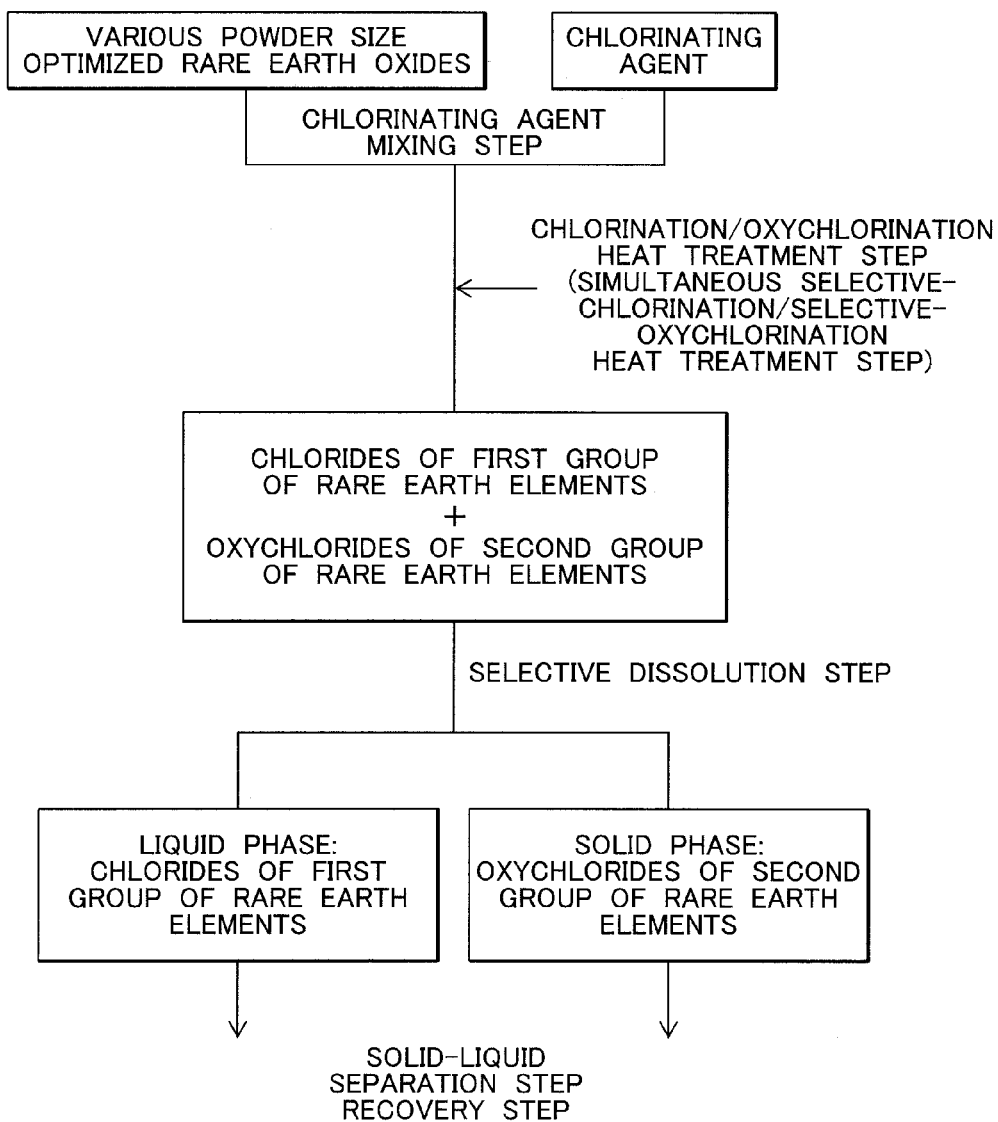
FIG. 3 is a flow chart showing an example of processing steps in another separation process in the rare earth separation method according to the invention.

FIG. 3 is a flow chart showing an example of processing steps in another separation process in the rare earth separation method according to the invention. The separation process of FIG. 3 is for most part the same as that of FIG. 2 except that the FIG. 3 chlorination/oxychlorination heat treatment step for forming the "first group rare earth chlorides"/"second group rare earth oxychlorides" mixture from the "rare earth oxide powder"/"chlorinating agent" mixture is different from the chlorination/oxychlorination heat treatment step of FIG. 2. So, only the FIG. 3 chlorination/oxychlorination heat treatment step will be described.

At the chlorination/oxychlorination heat treatment step in FIG. 3, a "rare earth chlorides"/"rare earth oxychlorides" mixture containing the first group rare earth chlorides and the second group oxychlorides is formed from the "rare earth oxide powder"/"chlorinating agent" mixture by selective chlorination and selective oxychlorination. That is, by this chlorination/oxychlorination heat treatment step, the two conversions (the conversion from the first group rare earth oxides into the first group rare earth chlorides and the conversion from the second group rare earth oxides into the second group rare earth oxychlorides) can be performed all at once (by a single processing step). This chlorination/oxychlorination heat treatment step in FIG. 3 is the second type of chlorination/oxychlorination heat treatment step of the invention and hereinafter referred to as the simultaneous selective-chlorination/selective-oxychlorination heat treatment step. Similarly to the separation process in FIG. 2, the separation process in FIG. 3, too, is the most important feature of the invention.

The individual processing steps in the pretreatment and separation processes will be explained below in more detail.

(Starting Powder Preparation Step)

At this starting powder preparation step, a powder (starting powder) of a rare earth magnet scrap (such as a wasted magnet and sludge) is prepared. The processing method varies depending on the type and shape of the magnet scrap, but is broadly classified as (a) crushing/milling procedure and (b) drying procedure.

(a) Crushing/Milling Procedure

In order to separate various rare earth elements contained in a bulk magnet scrap (such as a wasted magnet and a failed magnet) from each other and recover the individual rare earth elements, the bulk magnet scrap needs to be crushed and/or milled into a powder. There is no particular limitation on the crushing/milling method, but any known method may be used. However, a used magnet may sometimes have an anti-oxidation surface coating (such as a nickel film and an aluminum film). In order to effectively crush/mill such an anti-oxidation coated magnet scrap, hydrogen pulverizing is preferable. Of course, hydrogen pulverizing may be used for any other bulk magnets without any anti-oxidation coating.

The hydrogen pulverizing involves, for example, heating a magnet scrap at a temperature from room temperature to 300° C. in a pressurized hydrogen (about 0.12 MPa) for about 1 hour. By this procedure, the high pressure atmosphere causes the magnet scrap to absorb the hydrogen, which then causes the magnet scrap to expand, which finally causes the magnet scrap to burst into small blocks/lumps. After the hydrogen pulverizing, the metal coating remains as a separate residue in a form of film, and therefore can be easily physically separated out by sieving or the like. Finally, the resulting small blocks/lumps are further milled using a milling machine (such as a ball mill and an attritor) to obtain a starting powder of the rare earth magnet scrap.

(b) Drying Procedure

Magnet sludge (such as a cutting scrap generated during magnet manufacture) is usually in a powder form, and therefore needs no more crushing or milling. However, magnet sludge is more usually soaked in abrasive water (magnet cutting and polishing water), and therefore the excessive absorbed water needs to be removed (dried).

There is no particular limitation on the drying method, but any known method may be used so long as the water content can be reduced to less than 60%. For example, the supernatant in the container of the water-soaked magnet sludge may be removed and/or the water-containing magnet sludge may be dried in a drying oven or the like, thereby obtaining a rare earth magnet powder (starting powder) having a sufficiently small water content.

(Magnet Component Oxidation Heat Treatment Step)

At this magnet component oxidation heat treatment step, the staring powder is oxidized to form oxides of the components of the magnet scrap (an oxide powder of the magnet scrap components). The oxidation is preferably performed by heating or combustion. The heating or combustion is preferably conducted in an oxidizing atmosphere (an oxygen containing atmosphere such as an air flow and an inert gas/oxygen mixture flow). The heating or combustion temperature is preferably from 350 to 1000° C. and the heating or combustion time is preferably from 1 to 5 hours. Generally, as the heating/combustion temperature is increased, the heating/combustion time can be reduced.

(Rare Earth Oxide Separation Step)

At this rare earth oxide separation step, a rare earth oxide powder is separated from the oxide powder of the magnet scrap components. An example of rare earth magnets is an Nd (neodymium)-Fe (iron)-B (boron) system magnet that contains iron (as the major component), neodymium, praseodymium, dysprosium, boron and other minor elements. This rare earth oxide separation step is an important process for separating only rare earth elements from such a rare earth magnet. There is no particular limitation on the separation method, but (c) carbothermal reduction process or (d) selective acid dissolution process is preferable.

(c) Carbothermal Reduction Process

A carbothermal reduction process according to the invention involves, for example, mixing the oxide powder of the rare earth magnet scrap components with a carbon powder, and then heating the resulting mixture powder at a temperature from 1300 to 1700° C. in an inert gas for 10 min to 3 hours. By this carbothermal reduction procedure, the iron oxides (the major component) are selectively reduced into metal iron; consequently, a mixture mainly containing a small lump (small lumps) of metal iron and a small lump (small lumps) of rare earth oxides is obtained. The small lump (small lumps) of rare earth oxides can be easily separated from the small lump (small lumps) of metal iron by mechanical vibration or the like.

(d) Selective Acid Dissolution Process

A selective acid dissolution process according to the invention involves, for example, immersing the oxide powder of the rare earth magnet scrap components in an inorganic acid (such as hydrochloric acid), thereby selectively dissolving only rare earth oxides in the inorganic acid. This procedure utilizes difference of the solubility in the inorganic acid between the rare earth oxides and the other non-rare earth oxides. Next, the resulting solution is filtered to remove the undissolved non-rare earth oxides, thereby obtaining a solution in which only the rare earth oxides are dissolved. Then, the filtered solution is adjusted for hydrogen ion exponent (pH). After that, a precipitant (e.g., sodium carbonate or oxalic acid) is added to the filtered and pH adjusted solution, thereby precipitating rare earth carbonates or rare earth oxalates. Then, the precipitates are filtered and taken up to obtain solid rare earth compounds (rare earth carbonates or rare earth oxalates). Then, the rare earth compounds are heated at about 800° C. in an oxidizing atmosphere, thereby forming a rare earth oxide powder.

(Boron Reduction Step)

As described above, rare earth magnets often contain boron. At this boron reduction step, boron contained (remained) in the rare earth oxide powder separated at the previous rare earth oxide separation step is reduced or removed. Examples of the boron reduction method include (e) alkali carbonate addition and heat treatment procedure, and (f) reduction and alloying procedure. This step is preferably carried out, but can be spared when the boron content in the separated rare earth oxide powder is sufficiently small.

(e) Alkali Carbonate Addition and Heat Treatment Procedure

This alkali carbonate addition and heat treatment procedure according to the invention involves adding an alkali carbonate (e.g., potassium carbonate) to the rare earth oxide powder separated at the previous rare earth oxide separation step, and then heating the mixed powder in a non-oxidizing environment (an environment containing practically no oxygen, for example, an inert gas flow (such as argon and nitrogen) or in vacuum). During the heat treatment, first, the boron and the alkali carbonate react to form a compound having a high vapor pressure. Then, the resulting high vapor pressure compound is sublimated. In this manner, the boron contained in the separated rare earth oxide powder can be reduced or removed.

(f) Reduction and Alloying Procedure

This reduction and alloying procedure according to the invention is particularly effective when the carbothermal reduction process is used at the rare earth oxide separation step. Therefore, this reduction and alloying procedure is preferably combined with the carbothermal reduction process. In more detail, the reduction and alloying procedure according to the invention involves, after the iron oxides is selectively reduced into metal iron by the above-described carbothermal reduction procedure, further heating the "boron containing rare earth oxides"/"metal iron" mixture at 1600° C. or higher. By this reduction and alloying procedure, the boron oxide contained in the rare earth oxides is reduced into elemental boron, which is then alloyed with the reduced iron. In this manner, the boron remained in the separated rare earth oxides can be decreased or eliminated together with the iron.

(Powder Size Optimization Step)

At this powder size optimization step, the rare earth oxide powder separated at the rare earth oxide separation step is milled or agglomerated/granulated to obtain an optimal powder size distribution. When the rare earth oxides are separated by the above-described carbothermal reduction process, the resulting separated rare earth oxide powder is usually in the form of a small lump (small lumps) and is therefore preferably crushed and/or milled using a milling machine or the like to obtain smaller grains. In contrast, when the rare earth oxides are separated by the above-described selective acid dissolution process, the resulting separated rare earth oxide powder is in the form of undesirably too fine particles and is therefore preferably agglomerated/granulated using an agglomerator (a granulator) to obtain a desirable coarser powder. The powder size optimization step according to the present invention also includes just measuring the grain size of the powder of the rare earth oxides separated at the preceding rare earth oxide separation step.

In order to obtain a sufficiently uniform fine powder, the milling step is preferably carried out by (g) a first milling step and (h) a succeeding second milling step. When the second milling step incurs a large additional material cost and/or a large time loss because of the performance of the second milling machine used or other reason, the second milling step can be spared.

(g) First Milling Step

Preferably, particle size at cumulative 50 vol. % of the resulting particle size distribution obtained by the first milling step is 0.5 µm or more as measured using a laser diffraction particle size distribution analyzer, and particle size at cumulative 90 vol. % is 10 µm or less. Herein and in the appended claims, the particle size at cumulative 50 and 90 vol. % of a particle size distribution is sometimes referred to simply as the cumulative 50 and 90 vol. % particle size, respectively. When the cumulative 90 vol. % particle size exceeds 10 µm, the resulting powder obtained by a single cycle of the succeeding second milling step is prone to be insufficiently uniform; therefore the second milling step is disadvantageously time consuming because the second milling step needs to be repeated until a desirable particle size distribution is obtained. If the cumulative 90 vol. % particle size obtained by the first milling step exceeds 10 µm and the second milling step is omitted, the later-described chlorination and oxychlorination reactions performed in the separation process is not sufficiently effected on many particles of the rare earth oxide powder, thereby degrading the separation ratios of the rare earth elements. When the cumulative 50 vol. % particle size falls below 0.5 µm, many of such too fine particles are prone to be uselessly evacuated out of the system during transferring from the first milling step to the succeeding second milling step, thus incurring a material loss (i.e., a yield reduction of the rare earth recovery).

(h) Second Milling Step

Preferably, the cumulative 50 vol. % particle size obtained by the second milling step is 0.04 µm or larger as measured using a laser diffraction particle size distribution analyzer, and the cumulative 90 vol. % particle size is 1.5 µm or smaller. By reducing the cumulative 90 vol. % particle size obtained by the second milling step to 1.5 µm or smaller, the chlorination and oxychlorination reactions performed in the next separation process can be more smoothly proceeded, thus providing the effect of increasing the separation ratios of the rare earth elements and/or an additional effect of decreasing the processing time. When the cumulative 50 vol. % particle size falls below 0.04 µm, the particle size of the resulting powder is too small, thereby causing a large material loss (a large powder loss at the second milling step) and also leading to a large overall yield reduction of the rare earth recovery.

(Additional Oxidation Heat Treatment Step)

At this additional oxidation heat treatment step, the grain size optimized rare earth oxide powder is further oxidized to completely oxidize the powder. This step is not essential for the invention, but can improve the separation ratios of the rare earth elements. The additional oxidation heat treatment step is preferably performed at a temperature higher than the temperature used at the above-described magnet scrap component oxidation step in an oxidizing atmosphere (an oxygen containing atmosphere such as an air flow and an inert gas/oxygen mixture flow). This additional oxidation heat treatment step is preferably conducted, for example, at 1000 to 1400° C. for 2 to 50 hours.

(Chlorinating Agent Mixing Step)

At this chlorinating agent mixing step, the rare earth oxide powder of the rare earth elements contained in the magnet scrap prepared by the preceding pretreatment process is mixed with a chlorinating agent to prepare a "rare earth oxide powder"/"chlorinating agent" mixture. The chlorinating agent preferably does not leave any unwanted elements (cations) in the resulting rare earth compounds to be used at the next chlorination/oxychlorination heat treatment step. Therefor, for example, ammonium chloride ($NH_4Cl$) is preferable. There is no particular limitation on the mixing method so long as the rare earth oxide powder and the chlorinating agent are uniformly mixed.

In order to enhance and ensure the progress of the later-described chlorination/oxychlorination reactions, the "rare earth oxide powder"/"chlorinating agent" mixing ratio is preferably from about 1 to about 3 times that of the stoichiometric ratio of the chlorination (oxychlorination) reaction. For example, in the case of ammonium chloride, the rare earth oxide powder is preferably mixed with ammonium chloride in a mixing ratio of 1 mole of the rare earth oxide powder relative to more than 6 moles to less than 20 moles of ammonium chloride.

When the rare earth oxide powder is mixed with ammonium chloride in a mixing ratio of 1 mole of the rare earth oxide powder relative to 6 moles or less of ammonium chloride, the rare earth chlorides cannot be sufficiently formed at the succeeding chlorination/oxychlorination heat treatment step. Such an insufficient mixing ratio is particularly undesirable in the case of the succeeding simultaneous selective-chlorination/selective-oxychlorination heat treatment step shown in FIG. 3 because the chlorination of the oxides of the first group of rare earth elements cannot be sufficiently completed.

When the rare earth oxide powder is mixed with ammonium chloride in a mixing ratio of 1 mole of the rare earth oxide powder relative to 20 moles or more of ammonium chloride, the second group rare earth oxides are also chlorinated at the succeeding simultaneous selective-chlorination/selective-oxychlorination heat treatment step shown in FIG. 3, therefore any desirable "rare earth chlorides"/"rare earth oxychlorides" mixture cannot be obtained. Another problem in the case of the chlorination/selective-oxychlorination heat treatment step shown in FIG. 2 is that an excessive chlorinating agent is only uselessly wasted.

In view of the stability and reproducibility of the chlorination and oxychlorination of the rare earth oxides as well as the manufacturing cost, the rare earth oxide powder is mixed with ammonium chloride in a mixing ratio of 1 mole of the rare earth oxide powder relative to preferably 9 to 15 moles (more preferably, 12 to 13.5 moles) of ammonium chloride.

(Chlorination/Oxychlorination Heat Treatment Step)

As described above, the present invention is most characterized by this chlorination/oxychlorination heat treatment step. At this chlorination/oxychlorination heat treatment step, a "rare earth chlorides"/"rare earth oxychlorides" mixture containing the chlorides of the first group of rare earth elements and the oxychlorides of the second group of rare earth elements is formed from the "rare earth oxide powder"/"chlorinating agent" mixture obtained at the chlorinating agent mixing step. The chlorination/oxychlorination heat treatment step in the FIG. 2 separation process and the simultaneous selective-chlorination/selective-oxychlorination heat treatment step in the FIG. 3 separation process will be described below, respectively.

(i) Chlorination Heat Treatment Step

At this chlorination heat treatment step of the FIG. 2 separation process, all the rare earth oxides in the "rare earth oxide powder"/"chlorinating agent" mixture are chlorinated to provide rare earth chlorides. The chlorination from a rare earth oxide ($RE_2O_3$) to the rare earth chloride is thought to proceed according to the chemical reaction formula (1) below.

$$RE_2O_3 + 6NH_4Cl \rightarrow 2RECl_3 + 6NH_3 + 3H_2O \quad \text{Chemical Reaction Formula (1),}$$

where and hereinafter RE is a rare earth element.

Figure 4:
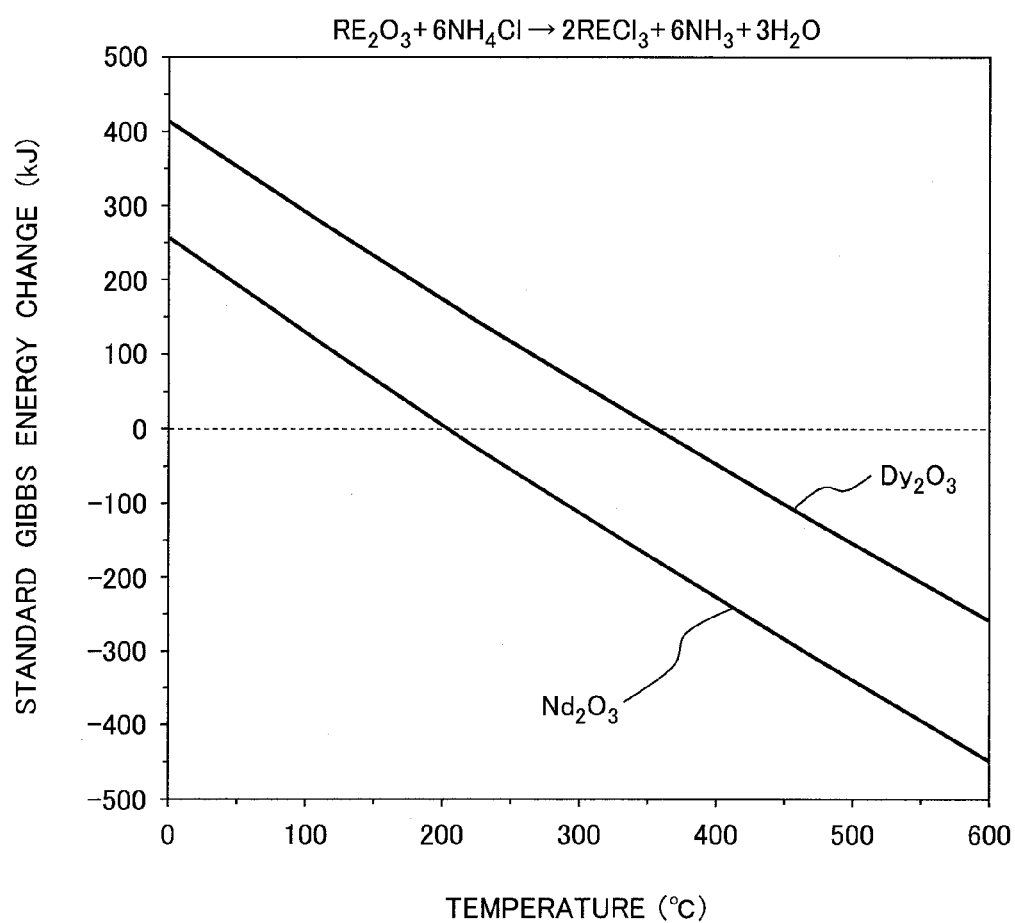
FIG. 4 is a graph showing, for exemplary rare earth oxides ($RE_2O_3$s), a relationship between standard Gibbs energy change of the chlorination reaction (1) and a temperature.

The reaction atmosphere is preferably a non-oxidizing environment (an environment containing practically no oxygen, for example, an inert gas flow (such as argon and nitrogen) or in vacuum). The optimal reaction temperature is determined by considering the following factors:

The optimal temperature of the chlorination reaction for generating a rare earth chloride from the "rare earth oxide"/"chlorinating agent" mixture can be chosen based on a relationship between standard Gibbs energy change of the chlorination reaction and a temperature. FIG. 4 is a graph showing, for exemplary rare earth oxides ($RE_2O_3s$), a relationship between standard Gibbs energy change of the chlorination reaction (1) and a temperature. As shown in FIG. 4, the standard Gibbs energy change decreases with increasing temperature. When the temperature increases to and beyond a threshold temperature, the standard Gibbs energy change is negative, and therefore the chlorination reaction can proceed continuously. Thus, whether a chlorination reaction is thermodynamically stable or unstable at a temperature depends on whether the standard Gibbs energy change is negative or positive at the temperature. However, the standard Gibbs energy change of a reaction does not relate to activation energy necessary for initiating the reaction and a reaction rate, thereby, such considerations are meaningless for the invention.

Turning now to FIG. 4 in more detail, the standard Gibbs energy change of the chlorination reaction of neodymium oxide ($Nd_2O_3$) with ammonium chloride is negative at temperatures of about 200° C. or higher, while the standard Gibbs energy change of the chlorination reaction of dysprosium oxide ($Dy_2O_3$) with ammonium chloride is negative at temperatures of about 350° C. or higher. Therefore, the optimal temperature of the chlorination reaction (1) of a $RE_2O_3$ is in the temperature range exhibiting a negative standard Gibbs energy change. In addition, the optimal temperature of the chlorination reaction (1) must be lower than a vaporization temperature of the resulting rare earth chloride, because the vaporization of the rare earth chloride reduces the yield of the rare earth element. Specifically, the $RE_2O_3$ reaction temperature is preferably from 200 to 450° C., and more preferably from 250 to 400° C.

Beside the rare earth chloride, ammonia gas ($NH_3$) and water vapor ($H_2O$) is formed as the by-products of the chlorination reaction (1). Such by-product gasses can be quickly exhausted with a gas flow used (such as argon and nitrogen) or through the exhaust port of a vacuum system used (or a reduced pressure system used). Therefore, the chlorination reactions can be smoothly proceeded without being hampered by such by-product gasses.

The chlorination reaction (1) will be discussed in more detail. The chlorination reaction (1) is thought to include two elemental reactions. In the first elemental reaction, a rare earth ammonium chloride is formed in a high temperature, atmospheric pressure inert gas flow. The chemical reaction formula (2) shown below is an example of such an elemental reaction (see, for example, Meyer, et. al., Mat. Res. Bull. 17 (1982) 1447-1455).

$$RE_2O_3 + 12NH_4Cl \rightarrow 2(NH_4)_2RECl_5 + 6NH_3 + 3H_2O \quad \text{Chemical Reaction Formula (2).}$$

In the second elemental reaction, probably, the ammonium chloride is dissociated from the rare earth ammonium chloride and unreacted ammonium chloride in the "rare earth oxide"/"chlorinating agent" mixture is removed to leave the rare earth chloride ($RECl_3$). The chemical reaction formula (3) below is an example of this second elemental reaction (see, for example, Meyer, et. al., Mat. Res. Bull. 17 (1982) 1447-1445). The second elemental reaction is preferably executed at a low pressure (e.g., a reduced pressure atmosphere evacuated by a rotary pump or the like), because the dissociated or unreacted ammonium chloride can be readily vaporized and decomposed. Furthermore, by conducting the reaction at 350° C. or higher, the vaporization and decomposition of the ammonium chloride can be promoted.

$$(NH_4)_2RECl_5 \rightarrow RECl_3 + 2NH_3 + 2HCl \quad \text{Chemical Reaction Formula (3).}$$

(j) Selective Oxychlorination Heat Treatment Step

At this selective oxychlorination heat treatment step in the separation process shown in FIG. 2, a "rare earth chlorides"/"rare earth oxychlorides" mixture is formed from the rare earth chlorides obtained at the preceding chlorination heat treatment step. The selective oxychlorination heat treatment is preferably performed in an oxidizing atmosphere (in an oxide containing atmosphere such as in an atmosphere, in a dry air flow and in an inert gas/oxygen mixture flow). By this step, the first group rare earth chlorides are hardly oxychlorinated (i.e., remain almost unchanged), while the second group rare earth chlorides are oxychlorinated.

Herein, a rare earth element in the first group of rare earth elements is defined as a rare earth element whose chloride is not oxychlorinated in a temperature range (such as neodymium and praseodymium in the invention's case), while a rare earth element in the second group of rare earth elements is defined as a rare earth element whose chloride is oxychlorinated in the same temperature range (such as dysprosium in the invention's case).

The oxychlorination reaction (a partial oxidation reaction) from a rare earth chloride ($RECl_3$) to the rare earth oxychloride (REOCl) probably proceeds according to the chemical reaction formula (4) below. This chemical reaction for forming the rare earth oxychloride (REOCl) from the rare earth chloride ($RECl_2$) accompanies a weight loss.

$$2RECl_3 + O_2 \rightarrow 2REOCl + 2Cl_2 \quad \text{Chemical Reaction Formula (4).}$$

In order to investigate the behavior of this oxychlorination reaction, various rare earth chlorides during this oxychlorination reaction were subjected to a thermogravimetric analysis in an atmosphere. The rare earth chlorides used were neodymium chloride (Sigma Aldrich Japan, Product Code 449946) and dysprosium chloride (Sigma Aldrich Japan, Product Code 325546), both of which rare earth elements are widely used for rare-earth magnets. The thermogravimetric analysis was conducted using a thermogravimetry (TA Instruments Japan, TGA-Q500). Each chloride sample powder (30 mg) was measured for the weight change during the oxychlorination (4) while heating the sample at a constant heating rate of 5° C./min from room temperature to 500° C.

Figure 5:
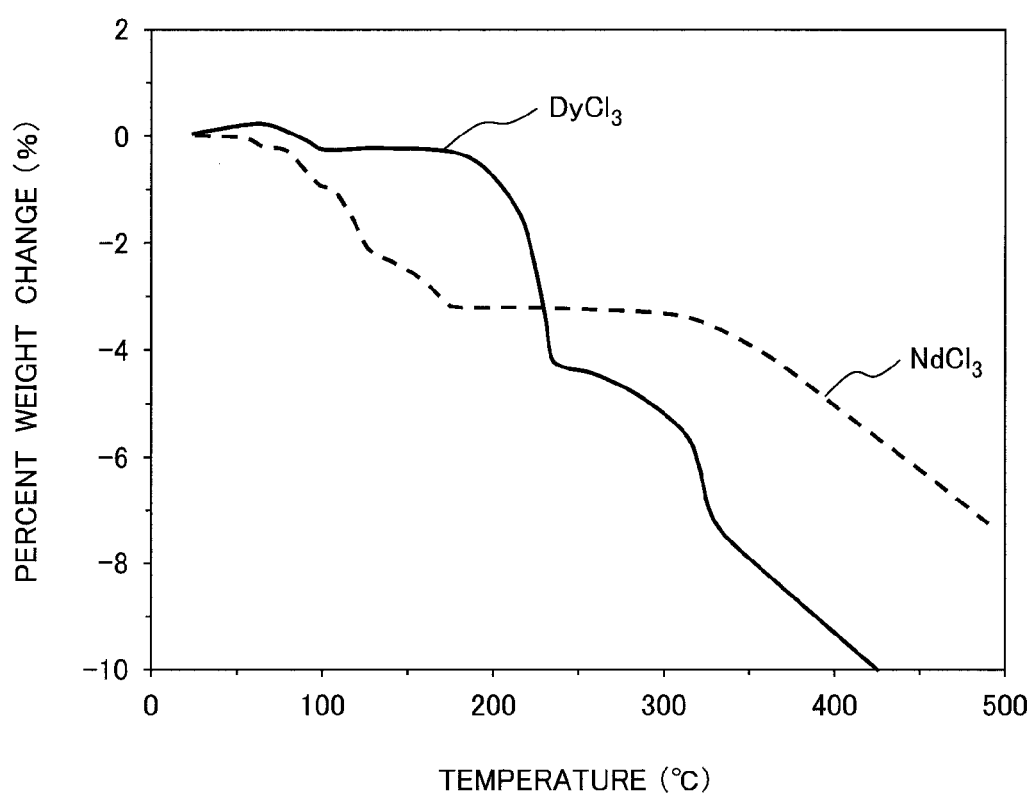
FIG. 5 is a chart showing a relationship between a temperature and a percent weight change in an atmosphere which is results of a thermogravimetric analysis for rare earth chlorides.

FIG. 5 is a chart showing a relationship between a temperature and a percent weight change in an atmosphere which is results of the thermogravimetric analysis for rare earth chlorides. As shown in FIG. 5, for both rare earth chlorides, the percent weight change (loss) increases with increasing temperature, showing that the oxychlorination reaction (4) actually proceeds. However, the weight change behavior is different depending on the type of rare earth element. Meanwhile, in this thermogravimetric analysis, an effect of moisture or the like adsorbed on the sample was carefully removed at a temperature range of 130° C. or below.

Examining FIG. 5 in more detail, the neodymium chloride ($NdCl_3$) sample exhibits a temperature range (180 to 300° C.) within which the percent weight reduction is almost constant (hereinafter referred to as a "weight change plateau region" or a "plateau region". In contrast, the dysprosium chloride ($DyCl_3$) sample exhibits a large percent weight reduction in the same temperature range as the plateau region of $NdCl_3$. Thus, the behavior of the oxychlorination reaction (partial oxidation reaction) varies depending on the type of rare earth element. For neodymium chloride ($NdCl_3$), the change of the percent weight reduction per unit temperature change was $1\times10^{-3}\%/°C$. in the plateau region.

The weight change plateau region will be discussed in more detail. Comparing FIGS. 4 and 5 shows that the starting temperature of the plateau region of $NdCl_3$ (see FIG. 5) almost coincides with the chlorination standard Gibbs energy change threshold temperature of $NdCl_3$ (see FIG. 4). Therefore, neodymium chloride ($NdCl_3$) is probably thermodynamically stable in the plateau region. In contrast, for dysprosium chloride ($DyCl_3$) which exhibits a large percent weight reduction in the $NdCl_3$ plateau region, the chlorination standard Gibbs energy change threshold temperature is about 350° C. as shown in FIG. 4, and therefore $DyCl_3$ is probably thermodynamically unstable in the $NdCl_3$ plateau region.

In order to further study this oxychlorination reaction, a relationship between a standard Gibbs energy change and a temperature in the oxychlorination reaction (4) was calculated for various rare earth chlorides. The calculation result shows that for a rare earth chloride exhibiting a weight change plateau region, the threshold temperature at and above which the standard Gibbs energy change in the oxychlorination reaction (4) for forming the rare earth oxychloride from the rare earth chloride is negative (hereinafter referred to as "the oxychlorination standard Gibbs energy change threshold temperature of the rare earth oxychloride") is higher than the chlorination standard Gibbs energy change threshold temperature of the rare earth chloride. That is, for a rare earth chloride exhibiting a weight change plateau region (hereinafter sometimes referred to simply as a "plateau-type rare earth chloride"), the rare earth oxychloride formed by the oxychlorination reaction (4) is thermodynamically stable at temperatures high than the starting temperature of the plateau region of the rare earth chloride.

By contrast, for a rare earth chloride exhibiting a large percent weight reduction without a plateau region (hereinafter sometimes referred to simply as a "non-plateau-type rare earth chloride"), the oxychlorination standard Gibbs energy change threshold temperature of the rare earth oxychloride is lower than the chlorination standard Gibbs energy change threshold temperature of the rare earth chloride. That is, for a non-plateau type rare earth chloride, the rare earth oxychloride formed from the rare earth chloride is more stable than the rare earth chloride in the plateau region of the plateau-type rare earth chloride.

It can be considered from the above discussion that in the plateau region, the chloride is more stable than the oxychloride for a first group plateau-type rare earth element, while the oxychloride is more stable than the chloride for a non-plateau type second group rare earth element.

In order to further confirm the above consideration, some rare earth chloride samples were maintained at a temperature within the plateau region and subjected to thermogravimetric analysis. The sample powders used were the same as the sample powders used for the above-described investigation of the chemical reaction (4)-neodymium chloride and dysprosium chloride. Similarly for the above-described thermogravimetric analysis, each rare earth chloride sample powder (30 mg) was heated to a certain temperature at a heating rate of 5° C./min, maintained at this temperature and then measured for a weight change of the sample during the oxychlorination of the sample.

Figure 6:
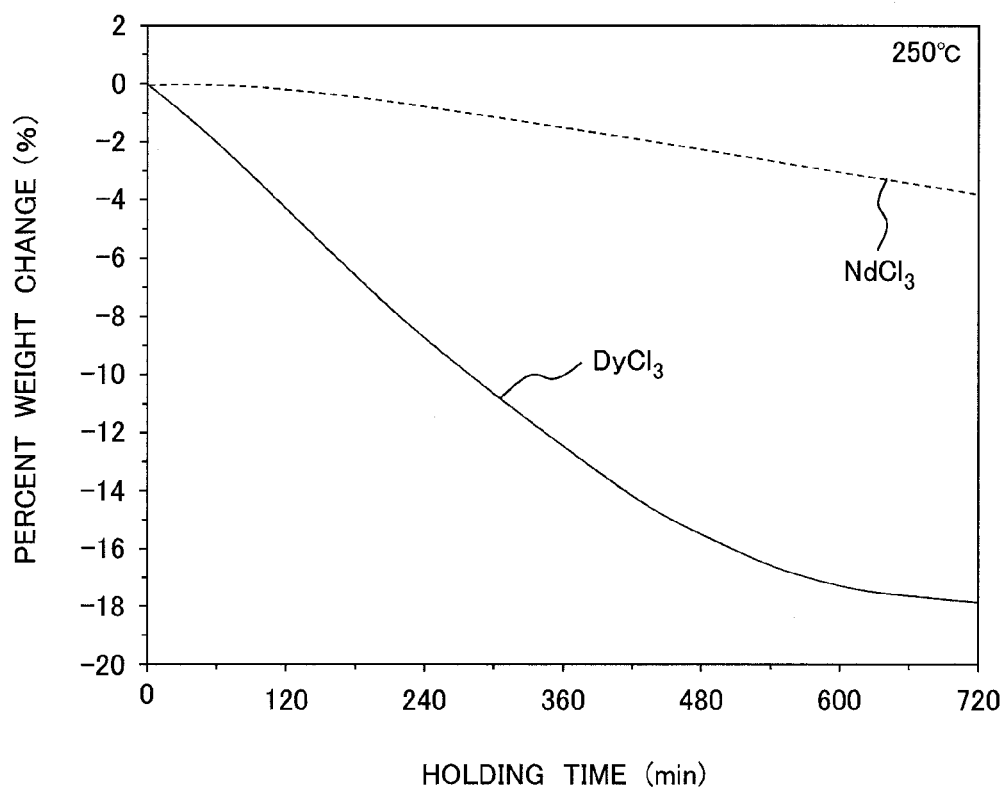
FIG. 6 is a chart showing a relationship between a percent weight change and holding time at 250° C. in an atmosphere which is results of a thermogravimetric analysis for neodymium chloride and dysprosium chloride.

FIG. 6 is a chart showing a relationship between a percent weight change and holding time at 250° C. in an atmosphere which is results of the thermogravimetric analysis for neodymium chloride and dysprosium chloride. As shown in FIG. 6, neodymium chloride ($NdCl_3$) exhibits almost no weight reduction, while the weight of dysprosium chloride ($DyCl_3$) decreases (i.e., the percent weight reduction increases) with increasing holding time.

After holding for 10 hours, the weight reduction of neodymium chloride ($NdCl_3$) was 3% while the weight reduction of dysprosium chloride ($DyCl_3$) was 17%. Assume that these weight reductions be caused by the chemical reaction (4), 14% of neodymium chloride ($NdCl_3$) is calculated to be transformed into neodymium oxychloride (NdOCl), and the 83% of dysprosium chloride ($DyCl_3$) is calculated to be transformed into dysprosium oxychloride (DyOCl).

It is confirmed from the above thermogravimetric analyses that when a mixture of a first group rare earth chloride and a second group rare earth chloride is heat treated in the weight change plateau region of the first group rare earth chloride, only the chloride of the second group rare earth is selectively oxychlorinated.

(k) Simultaneous Selective-Chlorination/Selective-Oxychlorination Heat Treatment Step At this simultaneous selective-chlorination/selective-oxychlorination heat treatment step in the separation process shown in FIG. 3, a "first group rare earth chlorides"/"second group rare earth oxychlorides" mixture is formed all at once (by a single processing step) from the "rare earth oxide powder"/"chlorinating agent" mixture obtained at the chlorinating agent mixing step. The atmosphere for this simultaneous selective-chlorination/selective-oxychlorination heat treatment step is preferably a non-oxidizing environment (an environment containing practically no oxygen, for example, an inert gas flow (such as argon and nitrogen) or in vacuum). This step is preferably conducted at a temperature at which only the first group rare earth oxides can be chlorinated and only the second group rare earth oxides can be oxychlorinated.

As described above, the chlorination from a rare earth oxide ($RE_2O_2$) to the rare earth chloride ($RECl_2$) is thought to proceed according to the chemical reaction formula (1) below.

$$RE_2O_2 + 6NH_4Cl \rightarrow 2RECl_3 + 6NH_3 + 3H_2O$$     Chemical Reaction Formula (1).

The oxychlorination from a rare earth oxide ($RE_2O_3$) to the rare earth oxychloride (REOCl) is thought to proceed according to the chemical reaction formula (5) below.

    Chemical Reaction Formula (5).

The chlorination from a rare earth oxychloride (REOCl) to the rare earth chloride ($RECl_2$) is thought to proceed according to the chemical reaction formula (6) below.

    Chemical Reaction Formula (6).

Figure 7:
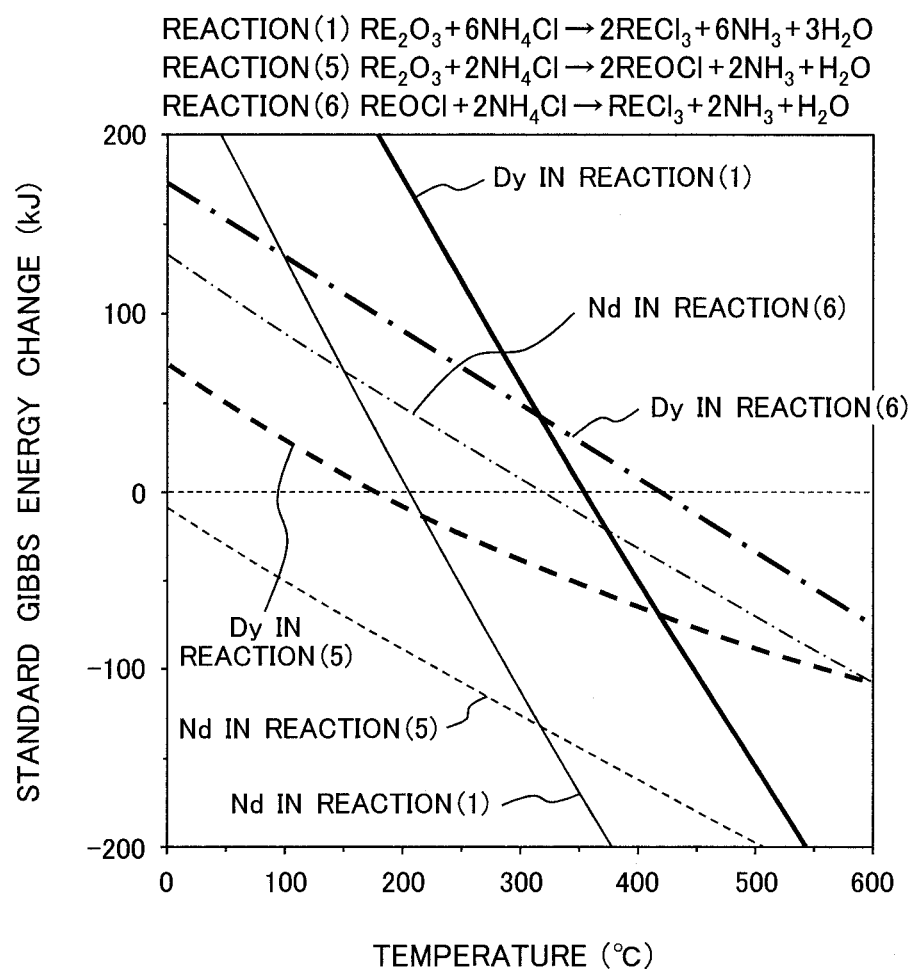
FIG. 7 is a graph showing, for neodymium and dysprosium and for the chemical reactions (1), (5) and (6), a relationship between the standard Gibbs energy change and a temperature.

Similarly to the above discussion, the optimal temperature of the simultaneous selective-chlorination/selective-oxychlorination heat treatment step will be discussed by considering a relationship between the standard Gibbs energy change and a temperature of the above three chemical reactions (1), (5) and (6). FIG. 7 is a graph showing, for neodymium and dysprosium and for the chemical reactions (1), (5) and (6), a relationship between the standard Gibbs energy change and a temperature. As shown in FIG. 7, for each chemical reaction, when a temperature increases to and above a threshold temperature, the standard Gibbs energy change is negative and therefore the chemical reaction can proceed continuously.

In each chemical reaction, ammonia gas ($NH_3$) and water vapor ($H_2O$) is formed as the by-products of the chemical reaction. Such by-products can be quickly exhausted together with a gas flow (such as argon and nitrogen) or through the exhaust port of a vacuum (or a reduced pressure) system. Therefore, each chemical reaction can be smoothly proceeded without being hampered by such by-product gasses.

Examining FIG. 7 in more detail, the calculated standard Gibbs energy change in the oxychlorination reaction (5) for forming neodymium oxychloride (NdOCl) from neodymium oxide ($Nd_2O_3$) is negative over the entire calculated temperature range (0 to 600° C.), while the calculated standard Gibbs energy change in the reaction (5) for forming dysprosium oxychloride (DyOCl) from dysprosium oxide ($Dy_2O_3$) is negative about 180° C. or higher. That is, once the above two chemical reactions overcome its corresponding activation energy, the chemical reaction for forming neodymium oxychloride (NdOCl) from neodymium oxide ($Nd_2O_3$) and the chemical reaction of dysprosium oxide ($Dy_2O_3$) for forming dysprosium oxychloride (DyOCl) from dysprosium oxide ($Dy_2O_3$) can proceed continuously at temperatures 0° C. or higher and 180° C. or higher, respectively.

Furthermore, the calculated standard Gibbs energy change in the chlorination reaction (6) for forming neodymium chloride ($NdCl_3$) from neodymium oxychloride (NdOCl) is negative about 330° C. or higher, while the calculated standard Gibbs energy change in the chlorination reaction (6) for forming dysprosium chloride ($DyCl_3$) from dysprosium oxychloride (DyOCl) is negative about 420° C. or higher. That is, once the above two chemical reactions overcome its corresponding activation energy, the chemical reaction for forming neodymium chloride ($NdCl_3$) from neodymium oxychloride (NdOCl) and the chemical reaction for forming dysprosium chloride ($DyCl_3$) from dysprosium oxychloride (DyOCl) can proceed continuously at temperatures 330° C. or higher and 420° C. or higher, respectively.

The relationship between the temperature and the standard Gibbs energy change, for the chlorination reaction (1) for forming neodymium oxychloride from neodymium oxide ($Nd_2O_3$) and the chlorination reaction (1) for forming dysprosium chloride ($DyCl_3$) from dysprosium oxide ($Dy_2O_3$) is already shown in FIG. 4. According to FIG. 4, the standard Gibbs energy change in the chlorination reaction (1) for forming neodymium chloride ($NdCl_3$) from neodymium oxide ($Nd_2O_3$) is negative at about 200° C. or higher and the standard Gibbs energy change in the chlorination reaction (1) for forming dysprosium chloride ($DyCl_3$) from dysprosium oxide ($Dy_2O_3$) is negative at about 350° C. or higher. That is, once the two chemical reactions overcome its corresponding activation energy, the chemical reaction (1) of neodymium oxide ($Nd_2O_3$) with ammonium chloride and the chemical reaction (1) of dysprosium oxide ($Dy_2O_3$) with ammonium chloride can proceed without being retarded at temperatures 200° C. or higher and 350° C. or higher, respectively.

The results in FIG. 7 show that the thermodynamically stable temperature depends strongly on the type of rare earth element and the type of chemical reaction. Therefore, chlorination and oxychlorination reactions can be carried out simultaneously all at once by utilizing such differences in the thermodynamically stable temperature between the chlorination and oxychlorination reactions.

For example, neodymium chloride ($NdCl_3$) can be formed from a "neodymium oxide ($Nd_2O_3$)"/"dysprosium oxide ($Dy_2O_3$)" mixture at 200° C. or higher. In order to suppress the formation of dysprosium chloride ($DyCl_3$) and stably form dysprosium oxychloride (DyOCl), the simultaneous selective-chlorination/selective-oxychlorination heat treatment is preferably carried out at 420° C. or lower.

In order to determine the optimal heat treatment temperature for selectively chlorinating only the first group of rare earth oxides, it is probably also effective to consider the above-described elemental reactions (2) and (3) of the chlorination reaction (1).

(Selective Dissolution Step)

At this selective dissolution step, the "first group rare earth chlorides"/"second group rare earth oxychlorides" mixture obtained at either of the preceding chlorination/selective-oxychlorination heat treatment step or the simultaneous selective-chlorination/selective-oxychlorination heat treatment step is introduced into a solvent to selectively dissolve the rare earth chlorides in the solvent and leave the rare earth oxychlorides undissolved in the form of solid suspended particles. This step utilizes a difference of solubility in the solvent between the soluble first group rare earth chlorides and the insoluble second group rare earth oxychlorides.

Preferable solvents include pure water, lower alcohols and any mixture thereof. Preferable lower alcohols include methanol and ethanol. These solvents are less harmful to the environment and human body, thus simplifying the handling and the manufacturing equipment (i.e., leading to a cost reduction).

The resulting solution is preferably stirred if needed depending on the amounts of the "first group rare earth chlorides"/"second group rare earth oxychlorides" mixture and the solvent. For example, a stirring bar, an impeller, ultrasonic vibration, or the like may be used. The stirring effect can be promoted by heating. The heating temperature is preferably lower than a boiling point of the solvent in order to prevent loss of the solvent. When the solvent (solution) is heated, the dissolution bath is preferably sealed to suppress volatilization of the solvent.

(Solid-Liquid Separation Step)

At this solid-liquid separation step, the solution obtained at the previous step is subjected to a solid-liquid separation treatment to separate the first group of rare earth elements (chlorides) and the second group of rare earth elements (oxychlorides) from each other. There is no particular limitation on the solid-liquid separation method, but, for example, filtration may be used. By such filtration, the solution obtained at the selective dissolution step is separated into a filtrate in which the first group rare earth chlorides are dissolved and a filtered solid residue consisting mainly of the second group rare earth oxychlorides.

(Recovery Step)

At this recovery step, the first group rare earth elements and the second group rare earth elements are recovered, respectively, from the liquid and solid separated at the previous step. The first group rare earth chlorides dissolved in the filtrate obtained at the previous solid-liquid separation step can be recovered in the form of a solid powder by, for example, spraying the filtrate into a high temperature atmosphere using a spray dryer. Alternatively, the filtrate may be pH adjusted and added with a precipitant (such as ammonium carbonate ($(NH_4)_2CO_3$), ammonium hydrogen-carbonate ($NH_4HCO_3$), sodium carbonate ($Na_2CO_3$), sodium hydrogencarbonate ($NaHCO_3$), oxalic acid (($COOH)_2$), sodium oxalate (($COONa)_2$)) and sodium hydroxide ($NaOH$)), thereby obtaining an insoluble precipitate of the first group rare earth elements. Then, the precipitate is filtered, dried and roasted at about 900° C. in an atmosphere, thereby recovering the first group rare earth elements in the form of oxide.

The filtered solid residue of the second group rare earth oxychlorides is dried to recover a second group rare earth oxychloride powder. Alternatively, the filtered solid residue of the second group rare earth oxychlorides may be dissolved in an aqueous inorganic acid (such as dilute hydrochloric acid and dilute nitric acid) to form a solution of the hydrates of the second group rare earth elements. Then, the solution of the hydrates are pH adjusted and added with a precipitant (such as ammonium carbonate (($NH_4)_2CO_3$), ammonium hydrogen-carbonate ($NH_4HCO_3$), sodium carbonate ($Na_2CO_3$), sodium hydrogencarbonate ($NaHCO_3$), oxalic acid (($COOH)_2$), sodium oxalate (($COONa)_2$)) and sodium hydroxide ($NaOH$)) to reprecipitate second group rare earth compounds. Finally, the resulting insoluble precipitate of the second group rare earth compounds is filtered, dried and roasted at about 900° C. in an atmosphere, thereby recovering the second group rare earth elements in the form of oxide.

According to the invention, each rare earth oxide obtained at the recovery step may be returned to the chlorinating agent mixing step followed by repeating the procedure from the chlorinating agent mixing step to the recovery step, thereby increasing the separation ratio between the first group rare earth elements and the second group rare earth elements. In addition, the first group rare earth chlorides dissolved in the filtrate obtained at the previous solid-liquid separation step may be recovered by any other known wet separation method.

Thus obtained rare earth oxides (such as neodymium oxide and dysprosium oxide) can be reduced to its constituent rare earth element by molten salt electrolysis in a fluoride bath or the like. These rare earth elements can be recycled as starting materials for manufacturing rare earth magnets.

As has been described, by the separation method according to the invention, the first and second groups of rare earth elements can be simply and easily separated from each other at a high separation ratio and recovered.

The rare earth oxide powder obtained at the rare earth oxide separation step may sometimes contain non rare earth elements of the magnet scrap (such as iron, boron and aluminum) or other impurities not from the magnet scrap (such as silicon) that cannot be separated sufficiently at the rare earth oxide separation step. For example, iron can be converted into iron chloride at the chlorination/oxychlorination heat treatment step and exhausted out together with ammonium chloride by the vacuum evacuation system.

Similarly, part of boron, silicon and aluminum can be chlorinated at the chlorination/oxychlorination heat treatment step and exhausted out together with ammonium chloride by the vacuum evacuation system. The other part that is not chlorinated at the chlorination/oxychlorination heat treatment step remains in the form of oxide, which can be separated in the form of filtered solid residue together with the second group rare earth oxychlorides at the solid-liquid separation step. After that, when the second group rare earth oxychlorides are dissolved in an acid and reprecipitated at the recovery step, the above non rare-earth precipitates can be separated from the second group rare earth oxychlorides by utilizing a difference of the solubility or the chemical reactivity between the non-rare earth oxides and the second group rare earth oxychlorides.

[Rare Earth Element Separation System]

Figure 8:
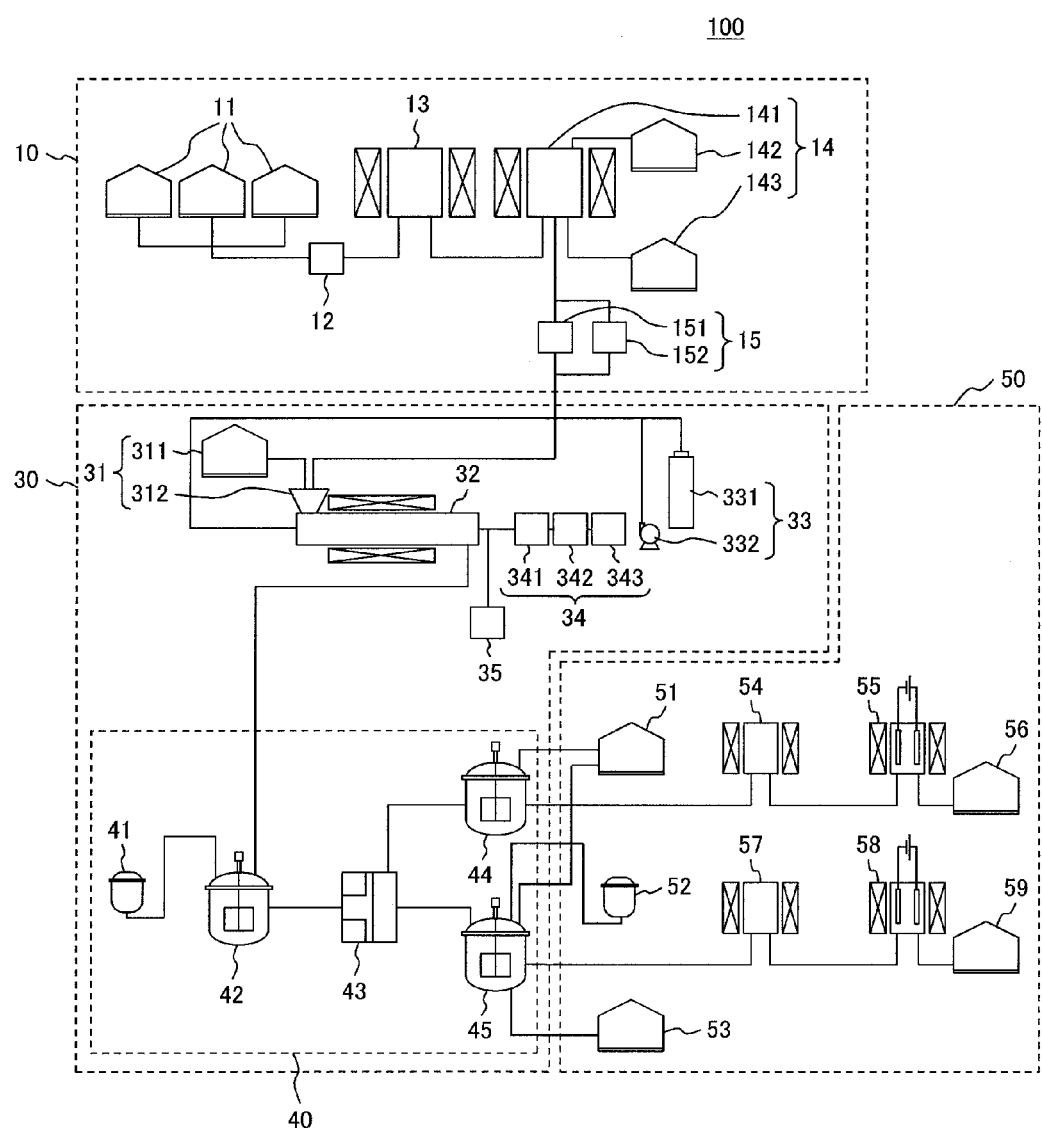
FIG. 8 is a system diagram of an example of a rare earth element separation system according to the present invention.
Figure 9:
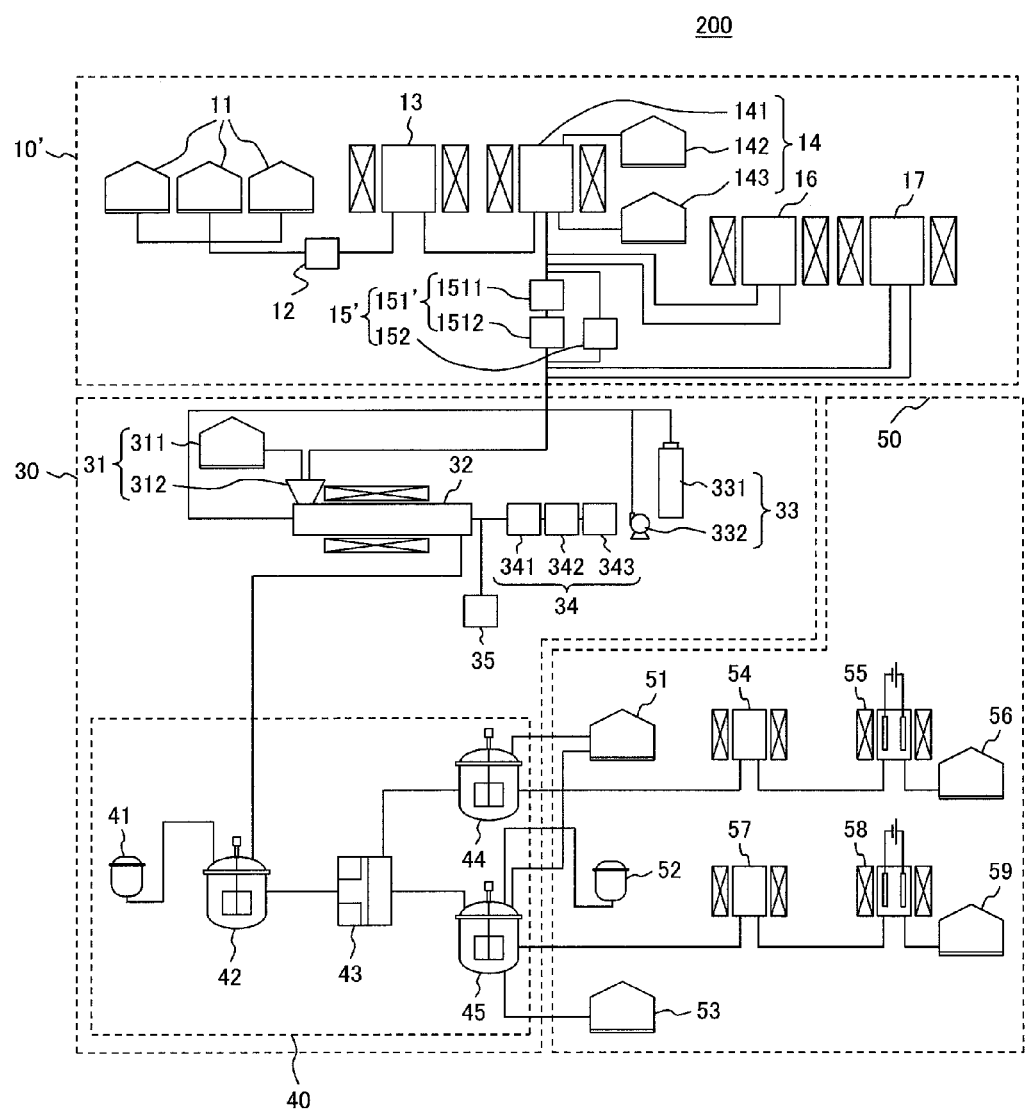
FIG. 9 is a system diagram of another example of a rare earth element separation system according to the invention.

FIGS. 8 and 9 are system diagrams of examples of a rare earth element separation system according to the present invention. FIGS. 8 and 9 show particular examples of the invention's rare earth element separation system in which the rare earth oxide separation step is performed by a carbothermal reduction process. Hereinafter, like parts may be sometimes designated with the same reference numerals without repeating the description thereof.

As shown in FIGS. 8 and 9, rare earth element separation systems 100 and 200 of the invention, respectively, roughly include two sections: rare earth magnet scrap pretreatment sections 10 and 10'; and rare earth element separation sections 30 and 30. Each rare earth element separation section 30 may be further connected downstream to a rare earth element recovery section 50.

The rare earth magnet scrap pretreatment section 10 of the FIG. 8 separation system 100 includes: a magnet scrap storage unit 11; a starting powder preparation unit 12; a magnet scrap component oxidation unit 13; a rare earth oxide separation unit 14; and a powder size optimization unit 15. The starting powder preparation unit 12 is connected between the magnet scrap storage unit 11 and the magnet scrap component oxidation unit 13, and includes devices for performing the above-described starting powder preparation step (such as a hydrogen pulverization device, a milling machine and a drying oven). The magnet scrap component oxidation unit 13 is connected between the starting powder preparation unit 12 and the rare earth oxide separation unit 14 and performs the above-described magnet scrap component oxidation step.

The rare earth oxide separation unit 14 is connected between the magnet scrap component oxidation unit 13 and the powder size optimization unit 15 and performs the above-described rare earth oxide separation step. The rare earth oxide separation unit 14 includes, for example, a carbothermal reduction furnace 141, a graphite storage device 142 for storing graphite powder and a pig iron recovery device 143 for recovering metal iron. The powder size optimization unit 15 is connected from the rare earth oxide separation unit 14 and performs the above-described powder size optimization step. The powder size optimization unit 15 includes, for example, a powder size optimization device 151 (such as a milling machine and an agglomerating/granulating machine) and a particle size distribution analyzer 152.

The rare earth magnet scrap pretreatment section 10' of the FIG. 9 rare earth element separation system 200 is almost the same as the rare earth magnet scrap pretreatment section 10 of the FIG. 8 rare earth element separation system 100 except that the powder size optimization unit 15' is different from the powder size optimization unit 15, and a boron reduction unit 16 and an additional oxidation heat treatment unit 17 are additionally equipped. The boron reduction unit 16 performs the above-described boron reduction step and is connected with the rare earth oxide separation unit 14 and the powder size optimization unit 15'. The powder size optimization unit 15' optimizes the powder size of the separated rare earth oxide powder at the above-described powder size optimization step and is connected with the boron reduction unit 16 and the additional oxidation heat treatment unit 17. The powder size optimization unit 15' is different from the powder size optimization unit 15 in that the powder size optimization device 151' (a milling device in this example of FIG. 9) of the powder size optimization unit 15' includes a first milling machine 1511 and a second milling machine 1512. The additional oxidation heat treatment unit 17 performs the above-described additional oxidation heat treatment step and is connected from the milling unit 151'.

In both of the rare earth element separation systems 100 in FIGS. 8 and 200 in FIG. 9, the rare earth element separation section 30 includes a chlorinating agent mixing/supply unit 31, a chlorination/oxychlorination heat treatment unit 32, an atmosphere control unit 33, a waste gas disposal unit 34, a chemical reaction monitoring unit 35 and a chloride/oxychloride separation unit 40. The chlorinating agent mixing/supply unit 31 performs the above-described chlorinating agent mixing step and is connected with the powder size optimization unit 15 and the chlorination/oxychlorination heat treatment unit 32. The chlorinating agent mixing/supply unit 31 includes, for example, a chlorinating agent storage device 311 and a hopper 312.

The chlorination/oxychlorination heat treatment unit 32 performs the above-described chlorination/oxychlorination heat treatment step and is connected with, beside the chlorinating agent mixing/supply unit 31, the atmosphere control unit 33, the waste gas disposal unit 34, the chemical reaction monitoring unit 35 and the chloride/oxychloride separation unit 40. The chlorination/oxychlorination heat treatment unit 32 preferably includes a stirring device (such as an unshown reactor turning device) for stirring reactants in order to promote chemical reactions.

The atmosphere control unit 33 controls the heat treatment atmosphere at the chlorination/oxychlorination heat treatment step. Specifically, the atmosphere control unit 33 includes a gas supply device 331 and a vacuum evacuation device 332 in order to provide an atmospheric-pressure non-oxidizing atmosphere, a reduced-pressure non-oxidizing atmosphere or an atmospheric-pressure oxidizing atmosphere. There is no particular limitation on the vacuum evacuation device 332, but, for example, a rotary pump is suitable.

The waste gas disposal unit 34 disposes waste gasses (such as ammonia gas, hydrogen chloride gas and chlorine gas) generated at the chlorination/oxychlorination heat treatment step. The waste gas disposal unit 34 includes, for example, an ammonia gas disposal device 341, a hydrogen chloride gas disposal device 342 and a chlorine gas disposal device 343. There is no particular limitation on a disposal method, but any conventionally known method (such as scrubbing, burning and adsorption) may be used. When the separation process of FIG. 3 is adopted, the chlorine gas disposal device 343 can be spared.

The chemical reaction monitoring unit 35 (such as an ammonia gas sensor 351 and a chlorine gas sensor 352) is preferably connected between the waste gas disposal unit 34 and the chlorination/oxychlorination heat treatment unit 32 in order to increase the efficiency of the chemical reactions. The ammonia gas sensor 351 and the chlorine gas sensor 352 can monitor the progress of a chemical reaction by detecting an average concentration change per unit time (an average concentration change rate) of the reactant and product gasses generated during the chemical reaction. For example, the completion of a chemical reaction can be detected by abrupt drops of the product gas concentrations. Accordingly, the chemical reactions can be stably carried out in each rare earth element separation batch. Also, the heat treatment times of the rare earth element separation method can be optimized, thereby increasing the efficiency of the separation process. The chemical reaction monitoring unit 35 is not particularly limited to gas sensors, but may be, for example, a device for detecting the weight change of the reactants during each heat treatment.

The chloride/oxychloride separation unit 40 is connected from the chlorination/oxychlorination heat treatment unit 32 and performs the above-described selective dissolution and solid-liquid separation steps. The chloride/oxychloride separation unit 40 includes: for example, a solvent container 41 for storing and supplying a solvent used at the selective dissolution step; a dissolution bath 42 for performing the selective dissolution step; a filter 43 for separating a solid and a liquid; a liquid container 44 for storing and supplying the separated liquid having chlorides dissolved therein; and a solid oxychloride container 45 for storing and supplying the separated solid oxychloride. The separated liquid stored in the liquid container 44 and the solid oxychloride stored in the solid oxychloride container 45 are supplied to the rare earth element recovery section 50.

The rare earth element recovery section 50 includes, for example: a precipitant container 51; an inorganic acid container 52; an impurity recovery container 53; a roasting furnace 54 for the first group of rare earth elements; an electrolysis furnace 55 for the first group of rare earth elements; a rare earth metal recovery container 56 for the first group of rare earth elements; a roasting furnace 57 for the second group of rare earth elements; an electrolysis furnace 58 for the second group of rare earth elements; and a rare earth metal recovery container 59 for the second group of rare earth elements.

The liquid container 44 and the solid oxychloride container 45 are each connected from the precipitant container 51; and the solid oxychloride container 45 is connected from the inorganic acid container 52 and connected to the impurity recovery container 53. The solution of the first group rare earth chlorides in the liquid container 44 is pH adjusted and added with a precipitant to form insoluble first group rare earth precipitates. The first group rare earth precipitates are then filtered and taken up.

The solid-phase second group rare earth oxychlorides stored in the solid oxychloride container 45 and the inorganic acid in the inorganic acid container 52 are mixed to dissolve the oxychlorides in the inorganic acid. The undissolved solid materials remaining after the above procedure are recovered into the impurity recovery container 53. Then, the inorganic acid having the oxychlorides dissolved therein is pH adjusted and added with a precipitant to form insoluble second group rare earth precipitates. The formed insoluble second group rare earth precipitates are filtered and taken up.

The first group rare earth precipitates formed from the solutions supplied from the liquid container 44 are dried and roasted in the roasting furnace 54 to obtain the oxides of the first group of rare earth elements. The thus obtained oxides of the first group of rare earth elements are introduced to the electrolysis furnace 55, where the oxides are subjected to a molten salt electrolysis. By the molten salt electrolysis, the oxides of the first group of rare earth elements are reduced to the first group of rare earth elements, which are then recovered into the rare earth metal recovery container 56. These recovered rare earth elements can be recycled as starting materials for manufacturing rare earth magnets.

The solid-phase second group rare earth oxychlorides in the solid oxychloride container 45 are dried and roasted in the roasting furnace 57 to obtain the second group rare earth oxides. The thus obtained second group rare earth oxides are introduced into the electrolysis furnace 58 to subject the oxides to the molten salt electrolysis. By this molten salt electrolysis, the second group rare earth oxides are reduced to the second group of rare earth elements, which are then recovered into the rare earth metal recovery container 59. The recovered second group of rare earth elements can be recycled as starting materials for manufacturing rare earth magnets.

Figure 10:
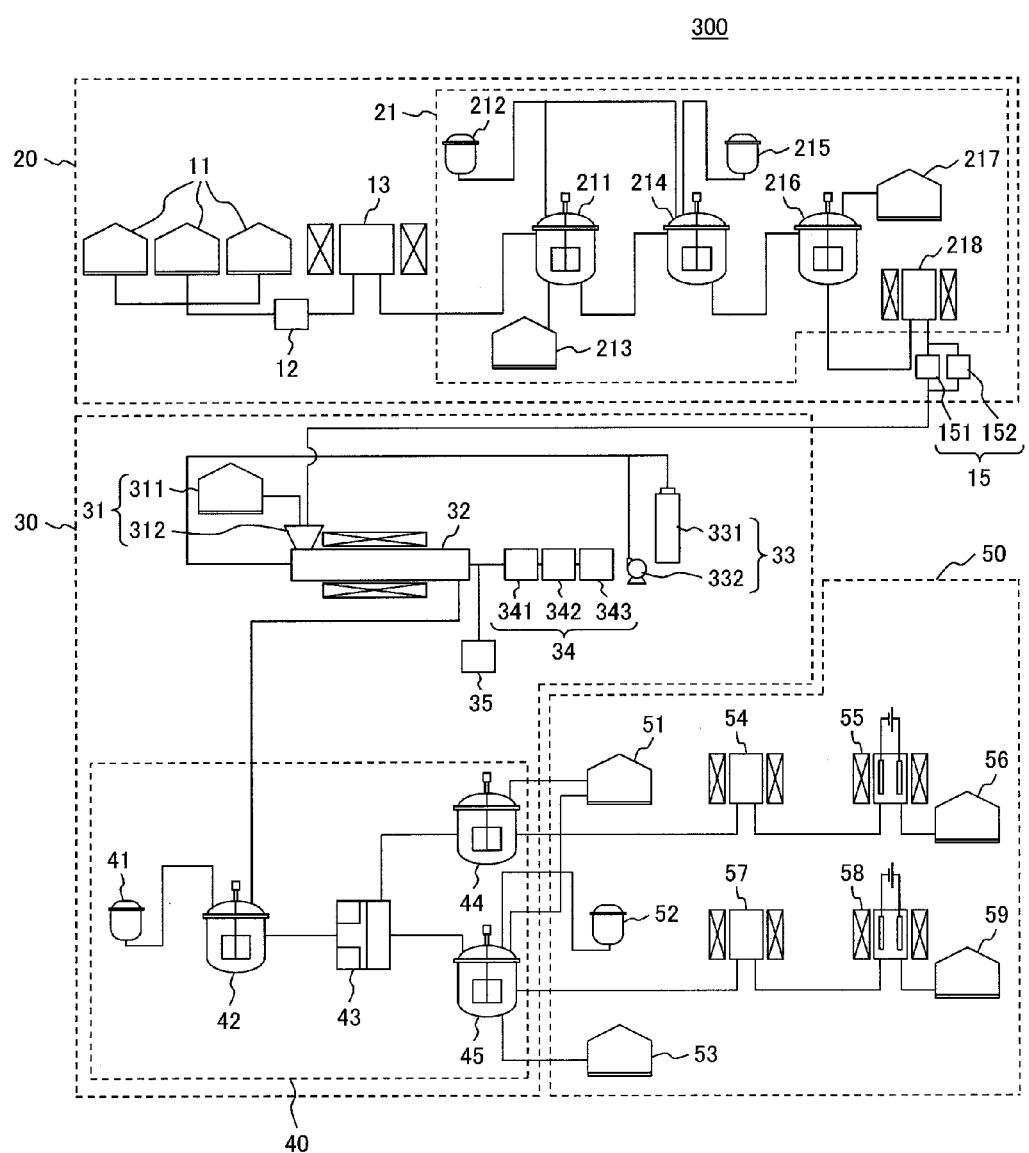
FIG. 10 is a system diagram of still another example of a rare earth element separation system of the invention.

FIG. 10 is a system diagram of still another example of a rare earth element separation system of the invention. In the FIG. 10 system, the aforementioned selective acid dissolution is used at the rare earth oxide separation step. The rare earth element separation system 300 in FIG. 10 is the same as the rare earth element separation system 100 in FIG. 8 except that the rare earth magnet scrap pretreatment section 20 is different from the rare earth magnet scrap pretreatment section 10.

The rare earth magnet scrap pretreatment section 20 includes a magnet scrap storage unit 11, a starting powder preparation unit 12, a magnet scrap component oxidation unit 13, a rare earth oxide separation unit 21 and a powder size optimization unit 15. The rare earth oxide separation unit 21 includes, for example, an acid dissolution bath 211, an inorganic acid container 212, an impurity recovery container 213, a pH adjustment bath 214, a pH-adjusted solution container 215, a solid-liquid separation bath 216, a precipitant container 217 and an rare earth compound oxidation device 218. The rare earth oxide separation procedure at the rare earth oxide separation unit 21 is carried out according to the aforementioned rare earth oxide separation step using the selective acid dissolution method. The impurities that are not dissolved in the inorganic acid used in the selective acid dissolution method are recovered into the impurity recovery container 213.

EXAMPLES

The present invention will be described below more specifically by way of examples. However, the invention is not limited to the specific examples below.

(Rare Earth Element Separation Experiment, Inventive Example 1)

In this experiment (Inventive Example 1), rare earth elements contained in a volume of rare earth (Nd—Fe—B) magnet sludge were separated from each other using the rare earth element separation system 100 shown in FIG. 8 and according to the separation process shown in FIG. 2. The composition of the sludge used was measured by X-ray fluorescence quantitative analysis (XRF) (the measurement condition will be described later). The sludge had a composition of 68 mass % Fe, 22.2 mass % Nd, 4.3 mass % Pr, 3.6 mass % Dy, 0.9 mass % B, 0.5 mass % Si and 0.5 mass % Al.

The Si is probably a foreign contaminant got into the sludge during the cutting and/or polishing of rare earth magnets. The step-by-step compositional change is shown in Table 1. The present invention assumes that praseodymium can be separated and recovered together with neodymium because these two elements are inseparably similar in many of the physical and chemical properties to each other.

As described before, sludges often contain a lot of water because sludges are usually soaked in polishing or cutting water. Therefore, the excessive absorbed water in the magnet sludge was removed according to the aforementioned drying procedure in the starting powder preparation step. The water-containing magnet sludge was introduced into the starting powder preparation unit 12 (a drying oven in this experiment), where the sludge was heated at 150° C. for 1 hour. By this drying procedure, about 0.6 kg of dried sludge was obtained. Then, the dried sludge was introduced into the magnet scrap component oxidation unit 13 (for example, a cylindrical roasting kiln), where the sludge was heated at 860° C. in an atmosphere for two hours. By this heat treatment, about 0.81 kg powder of the oxides of the components of the magnet sludge was obtained.

Next, the aforementioned rare earth oxide separation step was performed as follows: The thus obtained oxide powder of the magnet sludge components was added and mixed with about 0.3 kg of a carbide powder, which was then introduced in the carbothermal reduction furnace 141 where the mixture powder was heated at 1400° C. in an argon gas flow for 2 hours according to the aforementioned carbothermal reduction procedure. By this carbothermal reduction procedure, the oxide powder of the magnet sludge components was converted into a mixture of small lumps of metal iron and small lumps of oxides. Then, the metal iron small lumps were removed from the mixture, thereby obtaining about 0.3 kg small lumps of oxides.

A fragment of the thus obtained small lumps of oxides was subjected to an X-ray diffraction (XRD) measurement. The resulting XRD peaks were mainly from rare earth oxides (including complex oxides). The average composition of the small lumps of oxides was also measured by X-ray fluorescence quantitative analysis (XRF). Little or no iron component was detected. The XRF condition will be explained later. This composition measurement is also shown in Table 1 described later.

The thus separated rare earth oxides were in the form of small lumps. Therefore, the small lumps of rare earth oxides was subjected to the aforementioned powder size optimization step using the powder size optimization unit 151 (a dry ball mill in this experiment) to obtain a powder of an optimal particle size. A scanning electron microscope (SEM) observation showed that the small lumps of rare earth oxides before the milling procedure contained many relatively large grains of 300 μm or more.

Figure 11:
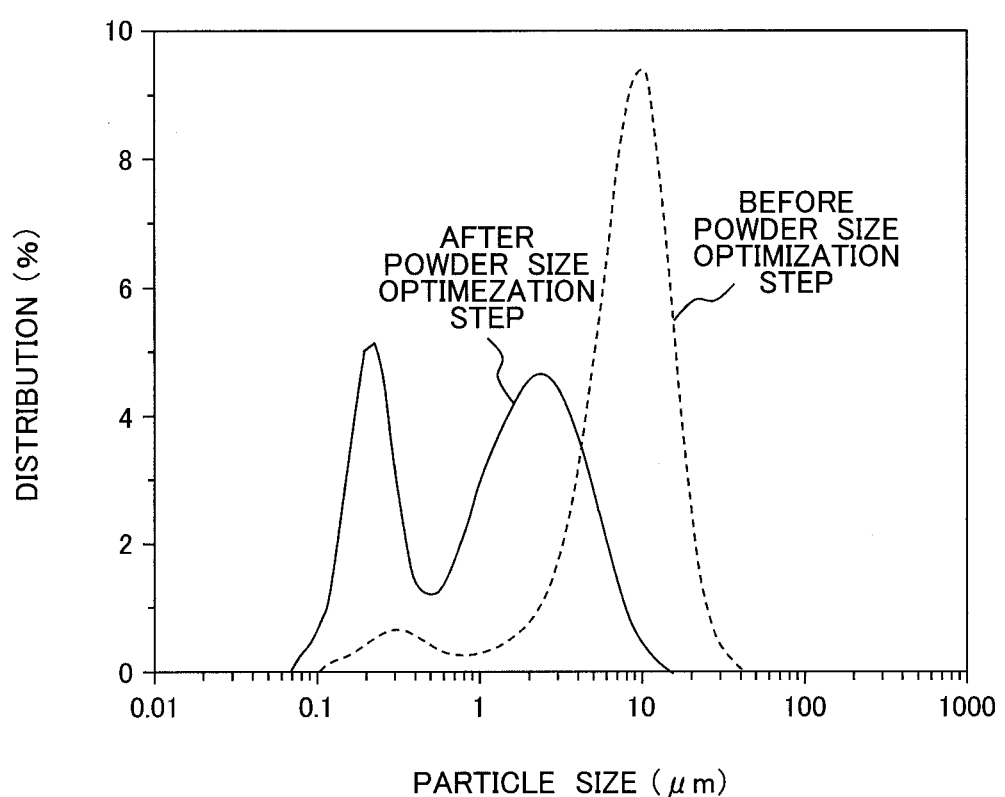
FIG. 11 is a graph showing powder size distributions before and after a powder size optimization step of Inventive Example 1.

FIG. 11 is a graph showing powder size distributions before and after the powder size optimization step of Inventive Example 1. The powder size distribution measurement was performed using a laser diffraction/scattering particle size distribution analyzer (HORIBA, Ltd., LA-950V2). As shown in FIG. 11, the cumulative 50 vol. % particle size was 7.5 μm and the cumulative 90 vol. % particle size was 22 μm before the powder size optimization step, while the cumulative 50 vol. % particle size was 1.2 μm and the cumulative 90 vol. % particle size was 8.2 μm after the powder size optimization step. Although many large grains of 300 μm or more were observed under an SEM, such large grains were not detected by the laser analyzer as shown in FIG. 11. This is probably because such large grains sank at the bottom of the laser analyzer sample bottle.

Next, the particle size optimized rare earth oxide powder was mixed with a chlorinating agent (ammonium chloride ($NH_4Cl$)) at the chlorinating agent mixing/supply unit 31 to perform the chlorinating agent mixing step and then supplied to the chlorination/oxychlorination heat treatment unit 32. The ammonium chloride was mixed with the rare earth oxide powder in an amount twice the stoichiometric ratio of the chemical reaction (1) (for example, 12 moles $NH_4Cl$ relative to 1 mole $RE_2O_3$).

The resulting "rare earth oxide powder"/"chlorinating agent" mixture was subjected to the chlorination/oxychlorination heat treatment step in the separation process shown in FIG. 2 using the chlorination/oxychlorination heat treatment unit 32 and the atmosphere control unit 33. First, the "rare earth oxide powder"/"chlorinating agent" mixture was heated at 350° C. in an argon gas flow for 4 hours in order to carry out the aforementioned elemental chemical reaction (2), and then heated at 400° C. in vacuum for 2 hours in order to perform the aforementioned elemental chemical reaction (3). The product gasses generated by these two reactions (ammonia gas and hydrogen chloride gas) were disposed through the waste gas disposal unit 34.

After the chlorination procedure, the aforementioned selective oxychlorination procedure was performed as follows at the chlorination/oxychlorination heat treatment unit 32 and the atmosphere control unit 33: In order to separate dysprosium, the rare earth chlorinates containing dysprosium chlorinate ($DyCl_3$) were heated at 250° C. in a dry air flow for 10 hours, where oxychlorination of the dysprosium chlorinate ($DyCl_3$) proceeded according to the chemical reaction formula (4). This heat treatment temperature is in a temperature range within which neodymium chloride ($NdCl_3$) exhibits an almost constant percent weight reduction (a plateau region), and dysprosium chloride ($DyCl_3$) exhibits a large percent weight reduction (see FIG. 5).

Then, the aforementioned selective dissolution and solid-liquid separation steps were performed at the chloride/oxychloride separation unit 40 as follows: First, the "rare earth chlorides"/"rare earth oxychlorides" mixture obtained by the selective oxychlorination procedure was introduced in a solvent (pure water) and stirred with a stirrer for 24 hours. The resulting solution contained solid suspended particles and was turbid. After the solution was filtered, the filtrate was clear and solid residues were left on the filter medium. The solid residues were taken up and dried, thereby separating rare earth compounds.

The thus separated rare earth compounds were subjected to X-ray fluorescence quantitative analysis (XRF) as follows: The resulting rare earth compounds were mixed with a boric acid binder and pressed into a measurement specimen. The measurement was conducted using an X-ray fluorescence analyzer (Rigaku Corporation, ZSX Primus II). The measurement condition was: X-ray of Rh-Kα line; X-ray output of 3 kW; and measurement diameter of 20 mm. The composition of the rare earth compounds was calculated using the fundamental parameter (FP) method. The result is also shown in Table 1 described later.

The separation ratio of Dy (Dy separation ratio) was calculated by Equation (1) below using the weight concentrations of Dy, Nd and Pr (represented by [Dy], [Nd] and [Pr], respectively). The result is also shown in Table 1 described later.

$$\text{Dy separation ratio}(\%) = 100 \times ([Dy]/([Dy]+[Nd]+[Pr])) \quad \text{Equation (1)}.$$

(Rare Earth Element Separation Experiment, Comparative Example 1)

In this experiment (Comparative Example 1), rare earth elements were separated in the same way as Inventive Example 1 except that the grain size optimization step at the powder size optimization unit 151 was not performed. The composition of the rare earth compounds and the Dy separation ratio after the separation step of Comparative Example 1 are also shown in Table 1.

TABLE 1

Step-by-Step Composition Change of Inventive Example 1 and Comparative Example 1.

| Element | Sludge Composition (mass %) | Composition after Carbothermal Reduction (mass %) | Composition after Solid-Liquid Separation (mass %) | |
|---|---|---|---|---|
| | | | Inventive Example 1 | Comparative Example 1 |
| Fe | 68 | <0.1 | <0.1 | <0.1 |
| Nd | 22.2 | 66 | 50 | 67 |
| Pr | 4.3 | 18 | 10.3 | 19 |
| Dy | 3.6 | 13 | 39 | 11 |
| B | 0.9 | 2.8 | <0.1 | 2.2 |
| Si | 0.5 | 0.4 | 0.2 | 0.4 |
| Al | 0.5 | 0.6 | 0.5 | 0.6 |
| Dy Separation Ratio | 12% | 11% | 40% | 11% |

As shown in Table 1, for both Examples, the iron component contained in the magnet sludge was dramatically reduced by the carbothermal reduction procedure. The Dy separation ratio of Inventive Example 1 which was processed according the rare earth separation method of the invention was 40%, which was 3.5 times that of the magnet sludge (the starting magnet powder). Boron was also removed by the separation method of the invention. By contrast, for Comparative Example 1 in which the invention's grain size optimization step was not performed, the composition of the rare earth compounds after the solid-liquid separation step was almost the same as the composition of the rare earth oxides after the carbothermal reduction procedure. Also, the Dy was not concentrated and the B was not removed. This result shows that the invention's grain size optimization step is very important for the invention's rare earth separation method.

The Dy concentration can be further increased by oxidizing the separated second group rare earth compounds, returning the oxidized second group rare earth compounds to the chlorinating agent mixing step and repeating the procedure from the chlorinating agent mixing step to the second group rare earth element recovery step.

Dy recovery yield of Inventive Example 1 was 97%. Herein, the Dy recovery yield can be calculated by Equation (2) below using the mass of the rare earth oxide powder and the mass concentration of Dy in the rare earth oxide powder after the carbothermal reduction procedure (respectively represented by $w_0$ and $[Dy]_0$) and the mass of the rare earth compound powder and the mass concentration of Dy in the rare earth compound powder after the solid-liquid separation step (respectively represented by w and [Dy]).

$$\text{Dy recovery yield}(\%) = 100 \times (w \times [Dy])/(w_0 \times [Dy]_0) \quad \text{Equation (2)}.$$

(Rare Earth Element Separation Experiment, Inventive Examples 2 to 5)

In this experiment (Inventive Examples 2 to 5), rare earth elements contained in a volume of rare earth (Nd—Fe—B)

magnet sludge were separated from each other using the rare earth element separation system 300 shown in FIG. 10 and according to the separation process shown in FIG. 2. The magnet sludge used was the same as that used in Inventive Example 1.

Similarly to Inventive Example 1, about 6.4 kg of water-containing magnet sludge was subjected to the starting powder preparation step and the magnet scrap component oxidation step, thereby obtaining about 2.6 kg oxide powder of the magnet sludge components.

Then, the selective acid dissolution procedure of the rare earth oxide separation step was performed as follows: First, the oxide powder of the magnet sludge components was immersed in 10% hydrochloric acid and heated at 90° C. for 16 hours, thereby selectively dissolving only rare earth oxides in the hydrochloric acid. After that, the filtered solid residues such as iron oxides were removed, thereby obtaining a hydrochloric acid filtrate having rare earth oxides dissolved therein. Next, the hydrochloric acid solution of rare earth oxides was pH adjusted and added with a precipitant (ammonium hydrogen-carbonate) to precipitate rare earth carbonates. The rare earth carbonate precipitates were filtered and recovered (the selective acid dissolution procedure). Finally, the rare earth carbonates were heated at about 800° C. in an atmosphere for 2 hours, thereby obtaining an oxide powder of only rare earth elements (oxidation heat treatment in the selective acid dissolution procedure).

After that, at the grain size optimization step, the particle size distribution of the thus obtained rare earth element oxide powder was measured using the aforementioned laser diffraction/scattering particle size distribution analyzer used in Inventive Example 1. The resulting grain size distribution was within the invention specified range.

The rare earth oxide powder confirmed at the previous grain size optimization step was divided into four samples (Inventive Examples 2 to 5). Similarly to Inventive Example 1, all four samples were mixed with a chlorinating agent (ammonium chloride ($NH_4Cl$)) at the chlorinating agent mixing/supply unit 31 to perform the chlorinating agent mixing step and then supplied to the chlorination/oxychlorination heat treatment unit 32. For all four samples, the ammonium chloride was mixed with the rare earth oxide powder in an amount twice the stoichiometric ratio of the chemical reaction (1) (for example, 12 moles $NH_4Cl$ relative to 1 mole $RE_2O_3$).

Next, all four samples were subjected to the aforementioned chlorination/oxychlorination heat treatment step in the separation process shown in FIG. 2 using the chlorination/oxychlorination heat treatment unit 32 and the atmosphere control unit 33. At this chlorination/oxychlorination heat treatment step, the first elemental reaction (2) of the chlorination reaction (1) was performed in an argon gas flow for 4 hours by varying the reaction temperature $T_{c1}$ from sample to sample (from 250 to 400° C.). For all the samples, the second elemental reaction (3) of the chlorination reaction (1) was performed at 400° C. in vacuum for 2 hours. The product gasses generated by these two elemental reactions (ammonia gas and hydrogen chloride gas) were disposed through the waste gas disposal unit 34.

Then, similarly to Inventive Example 1, the selective oxychlorination and selective dissolution steps were performed for all the samples. For all the samples, the separated rare earth compounds obtained at the solid-liquid separation step were subjected to the aforementioned X-ray fluorescence quantitative analysis (XRF). The composition and Dy separation ratio of the four samples are shown in Table 2.

TABLE 2

Step-by-Step Composition Change of Inventive Examples 2 to 5.

| Element | Sludge Composition (mass %) | Composition after Selective Acid Dissolution (mass %) | Composition after Solid-Liquid Separation (mass %) | | | |
|---|---|---|---|---|---|---|
| | | | Inventive Example 2 $T_{Cl}$ = 250° C. | Inventive Example 3 $T_{Cl}$ = 300° C. | Inventive Example 4 $T_{Cl}$ = 350° C. | Inventive Example 5 $T_{Cl}$ = 400° C. |
| Fe | 68 | 1.9 | 3 | 3.1 | <0.1 | 2.4 |
| Nd | 22.2 | 69.3 | 54.1 | 40.7 | 44.9 | 42.4 |
| Pr | 4.3 | 18 | 11.3 | 8.8 | 10.6 | 10.4 |
| Dy | 3.6 | 10 | 17.1 | 22.4 | 21.2 | 15.8 |
| B | 0.9 | 0.2 | <0.1 | <0.1 | <0.1 | <0.1 |
| Si | 0.5 | 0.4 | 0.1 | 0.3 | 0.2 | 0.2 |
| Al | 0.5 | 0.2 | 0.3 | 0.5 | 0.6 | 0.5 |
| Dy Separation Ratio | 12% | 10% | 21% | 31% | 28% | 23% |

In Inventive Example 2, the reaction temperature $T_{c1}$ of the first elemental reaction is 250° C. After the solid-liquid separation step, the Dy separation ratio was 20.7%, which was about 2 times that of the magnet sludge (the starting magnet powder). The rare earth chloride powder obtained at the chlorination step was subjected to an X-ray diffraction (XRD) measurement. The resulting XRD peaks were from neodymium chloride ($NdCl_3$), neodymium oxychloride (NdOCl), dysprosium chloride ($DyCl_3$) and dysprosium oxide ($Dy_2O_3$).

In Inventive Example 3, $T_{c1}$ was 300° C. After the solid-liquid separation step, the Dy separation ratio was 31.2%, which was about 3 times that of the magnet sludge (the starting magnet powder). The rare earth chloride powder obtained at the chlorination heat treatment step was subjected to an X-ray diffraction (XRD) measurement. The resulting XRD peaks were from neodymium chloride ($NdCl_3$), dysprosium chloride ($DyCl_3$) and dysprosium oxychloride (DyOCl).

In Inventive Example 4, $T_{c1}$ was 350° C. After the solid-liquid separation step, the Dy separation ratio was 27.6%, which was about 2.5 times that of the magnet sludge (the starting magnet powder). The rare earth chloride powder obtained at the chlorination heat treatment step was subjected to an X-ray diffraction (XRD) measurement. The resulting XRD peaks were from neodymium chloride ($NdCl_3$), dysprosium chloride ($DyCl_3$) and dysprosium oxychloride (DyOCl).

In Inventive Example 5, $T_{c1}$ was 400° C. After the solid-liquid separation step, the Dy separation ratio was 23.0%, which was about 2 times that of the magnet sludge (the starting magnet powder). The rare earth chloride powder obtained at the chlorination heat treatment step was subjected to an X-ray diffraction (XRD) measurement. The resulting XRD peaks were from neodymium chloride ($NdCl_3$), dysprosium chloride ($DyCl_3$) and dysprosium oxychloride (DyOCl).

As seen from the above results, for all of Inventive Examples 2 to 5, the Dy separation ratio was higher than that of the magnet sludge (the starting magnet powder). In addition, the Dy recovery yields of Inventive Examples 2 to 5 were 70% to 97%.

As has been described, the rare earth separation process of FIG. 2 can achieve a Dy separation ratio of about 21% to 40% per one separation process cycle. This result demonstrates that the rare earth separation method of the invention can highly concentrate the Dy component contained in a magnet scrap and separate the Dy component from the other components in the magnet scrap at a high separation ratio.

(Rare Earth Element Separation Experiment, Inventive Example 6)

In this experiment (Inventive Example 6), rare earth elements contained in a volume of rare earth (Nd—Fe—B) magnet sludge were separated from each other using the rare earth element separation system 100 shown in FIG. 8 and according to the separation process shown in FIG. 3. The magnet sludge used was the same as that used in Inventive Example 1.

Similarly to Inventive Example 1, about 2.0 kg of water-containing magnet sludge was subjected to the starting powder preparation step, the magnet scrap component oxidation step and the rare earth oxide separation step (using the carbothermal reduction process), thereby obtaining about 0.3 kg small lumps of rare earth oxides.

Then, the small lumps were milled as follows: The small lumps of rare earth oxides obtained by the carbothermal reduction process were milled using the powder size optimization unit 151 (a dry ball mill in this experiment) to obtain an optimal powder size. The powder size distribution of the milled powder was measured using the same laser diffraction/scattering particle size distribution analyzer as that used in Inventive Example 1. The resulting grain size distribution was within the invention specified range.

Similarly to Inventive Example 1, the milled rare earth oxide powder was mixed with a chlorinating agent (ammonium chloride ($NH_4Cl$)) at the chlorinating agent mixing/supply unit 31, and then supplied to the chlorination/oxychlorination heat treatment unit 32. At the chlorinating agent mixing step, the ammonium chloride was mixed with the rare earth oxide powder in an amount twice the stoichiometric ratio of the chemical reaction (1) (for example, 12 moles $NH_4Cl$ relative to 1 mole $RE_2O_3$).

Next, the "rare earth oxide powder"/"chlorinating agent" mixture obtained at the chlorinating agent mixing step was subjected to the aforementioned simultaneous selective-chlorination/selective-oxychlorination heat treatment step in the separation process shown in FIG. 3 using the chlorination/oxychlorination heat treatment unit 32 and the atmosphere control unit 33. First, the "rare earth oxide powder"/"chlorinating agent" mixture was heated at 350° C. in an argon gas flow for 4 hours in order to conduct the aforementioned elemental chemical reaction (2), and then heated at 400° C. in vacuum for 2 hours in order to carry out the aforementioned elemental chemical reaction (3). The product gasses generated at these two elemental reactions (ammonia gas and hydrogen chloride gas) were disposed through the waste gas disposal unit 34.

Then, similarly to Inventive Example 1, the selective dissolution step and the solid-liquid separation step were performed. The thus separated rare earth compounds were subjected to the aforementioned X-ray fluorescence quantitative analysis (XRF). The composition and Dy separation ratio after each processing step of Inventive Example 6 are shown in Table 3. Table 3 also shows the result of Comparative Example 1.

TABLE 3

Step-by-Step Composition Change of Inventive Example 6 and Comparative Example 1.

| Element | Sludge Composition (mass %) | Composition after Carbo-thermal Reduction (mass %) | Composition after Solid-Liquid Separation (mass %) | |
|---|---|---|---|---|
| | | | Inventive Example 6 | Comparative Example 1 |
| Fe | 68 | <0.1 | <0.1 | <0.1 |
| Nd | 22.2 | 66 | 52 | 67 |
| Pr | 4.3 | 18 | 12.3 | 19 |
| Dy | 3.6 | 13 | 35 | 11 |
| B | 0.9 | 2.8 | <0.1 | 2.2 |
| Si | 0.5 | 0.4 | 0.2 | 0.4 |
| Al | 0.5 | 0.6 | 0.5 | 0.6 |
| Dy Separation Ratio | 12% | 11% | 35% | 11% |

As shown in Table 3, similarly to Inventive Example 1, the iron component contained in the magnet sludge was dramatically reduced by the carbothermal reduction procedure. For Inventive Example 6 which was processed according to the separation method of the invention, the Dy separation ratio was 35%, which was about 3 times that of the magnet sludge (the starting magnet powder).

The above result demonstrates the advantageous effect of the rare earth separation method of the invention shown in FIG. 3. The Si and Al components can be removed by, for example, the aforementioned carbonate or oxalate precipitation procedure at the rare earth recovery step. Also, the Dy concentration can be further increased by the separated and recovered Dy compounds, returning the Dy compounds to the chlorinating agent mixing step and repeating the procedure from the chlorinating agent mixing step to the second rare earth recovery step.

(Rare Earth Element Separation Experiment, Inventive Examples 7 and 8)

In this experiment (Inventive Examples 7 and 8), rare earth elements contained in a volume of rare earth (Nd—Fe—B) magnet sludge were separated from each other using the rare earth element separation system 300 shown in FIG. 10 and according to the separation process shown in FIG. 3. The magnet sludge used was the same as that used in Inventive Example 1.

Similarly to Inventive Example 1, about 6.4 kg of water-containing magnet sludge was subjected to the starting powder preparation step and the magnet scrap component oxidation step, thereby obtaining about 2.6 kg oxide powder of the magnet sludge components.

Next, similarly to Inventive Example 2, the magnet component oxide powder was subjected to the selective acid dissolution procedure including the oxidation heat treatment, thereby obtaining a rare earth oxide powder.

After that, at the grain size optimization step, the particle size distribution of the thus obtained rare earth oxide powder was measured using the aforementioned laser diffraction/scattering particle size distribution analyzer used in Inventive Example 1. The resulting grain size distribution was within the invention specified range (i.e., the cumulative 50 vol. % particle size was 0.5 µm or larger and the cumulative 90 vol. % particle size was 10 µm or smaller).

The rare earth oxide powder obtained by selective acid dissolution procedure was divided into two samples (Inventive Examples 7 and 8). Similarly to Inventive Example 1, both of the two samples were mixed with a chlorinating agent (ammonium chloride ($NH_4Cl$)) at the chlorinating agent mixing/supply unit 31 to perform the chlorinating agent mixing step, and then supplied to the chlorination/oxychlorination heat treatment unit 32. At this chlorinating agent mixing step, the ammonium chloride was mixed with the rare earth oxide powder in an amount twice the stoichiometric ratio of the chemical reaction (1) (for example, 12 moles $NH_4Cl$ relative to 1 mole $RE_2O_3$).

Next, for both samples, the "rare earth oxide powder"/"chlorinating agent" mixture obtained at the chlorinating agent mixing step was subjected to the aforementioned simultaneous selective-chlorination/selective-oxychlorination heat treatment step in the separation process shown in FIG. 3 using the chlorination/oxychlorination heat treatment unit 32 and the atmosphere control unit 33. First, the "rare earth oxide powder"/"chlorinating agent" mixture was heated at a $T_{c1}$ temperature of 300° C. (for Inventive Example 8 sample) and 350° C. (for Inventive Example 7 sample) in an argon gas flow for 4 hours in order to carry out the aforementioned elemental chemical reaction (2), and then heated at 400° C. in vacuum for 2 hours in order to conduct the aforementioned elemental chemical reaction (3). The product gasses generated by these two elemental reactions (ammonia gas and hydrogen chloride gas) were disposed through the waste gas disposal unit 34.

Then, for both samples, similarly to Inventive Example 1, the selective dissolution step and the solid-liquid separation step were performed. The thus separated rare earth compounds were subjected to the aforementioned X-ray fluorescence quantitative analysis (XRF). The composition and Dy separation ratio of Inventive Examples 7 and 8 after each processing step are shown in Table 4.

TABLE 4

Step-by-Step Composition Change of Inventive Examples 7 and 8.

| Element | Sludge Composition (mass %) | Composition after Selective Acid Dissolution (mass %) | Composition after Solid-Liquid Separation (mass %) | |
|---|---|---|---|---|
| | | | Inventive Example 7 $T_{Cl}$ = 350° C. | Comparative Example 8 $T_{Cl}$ = 300° C. |
| Fe | 68 | 1.9 | 8 | 5.6 |
| Nd | 22.2 | 69.3 | 56.1 | 50.2 |
| Pr | 4.3 | 18 | 9.2 | 10.1 |
| Dy | 3.6 | 10 | 24.3 | 32.1 |
| B | 0.9 | 0.2 | <0.1 | <0.1 |
| Si | 0.5 | 0.4 | 1.4 | 0.7 |
| Al | 0.5 | 0.2 | 0.9 | 1.2 |
| Dy Separation Ratio | 12% | 10% | 27% | 35% |

In Inventive Example 7, $T_{c1}$ was 350° C. After the solid-liquid separation step, the Dy separation ratio was 27.1%, which was a little more than 2 times that of the magnet sludge (the starting magnet powder). The rare earth compound powder obtained at the simultaneous selective-chlorination/selective-oxychlorination heat treatment step was subjected to an X-ray diffraction (XRD) measurement. The resulting XRD peaks were from neodymium chloride ($NdCl_3$), dysprosium oxychloride (DyOCl) and dysprosium chloride ($DyCl_3$).

In Inventive Example 8, $T_{c1}$ was 300° C. After the solid-liquid separation step, the Dy separation ratio was 34.7%, which was about 3 times that of the magnet sludge (the starting magnet powder). The rare earth compound powder obtained at the simultaneous selective-chlorination/selective-oxychlorination heat treatment step was subjected to an X-ray diffraction (XRD) measurement. Similarly to Inventive Example 2, the resulting XRD peaks were from neodymium chloride ($NdCl_3$), dysprosium oxychloride (DyOCl) and dysprosium chloride ($DyCl_3$).

As seen from the above results, for both of Inventive Examples 7 and 8, the Dy separation ratio was higher than that of the magnet sludge (the starting magnet powder). It is thus demonstrated that the rare earth separation method of the invention can concentrate the Dy component contained in a magnet scrap. Also, neodymium chloride ($NdCl_3$) and dysprosium oxychloride (DyOCl) can be simultaneously formed all at once by the simultaneous selective-chlorination/selective-oxychlorination heat treatment procedure of the invention.

(Rare Earth Element Separation Experiment, Inventive Examples 9 to 12)

In this experiment (Inventive Examples 9 to 12), rare earth elements contained in a volume of rare earth (Nd—Fe—B) magnet sludge were separated from each other using the rare earth element separation system 200 shown in FIG. 9 and according to the separation process shown in FIG. 3. In this experiment, the rare earth element separation system 200 used was a high-volume batch separation system capable of processing a larger amount of rare earth elements contained in a magnet scrap than the rare earth element separation system 100 used in Inventive Example 1.

The magnet sludge used was the same as that used in Inventive Example 1. Similarly to Inventive Example 1, about 32 kg of water-containing magnet sludge was subjected to the starting powder preparation step and the magnet scrap component oxidation step, thereby obtaining about 13 kg oxide powder of the magnet sludge components.

Next, similarly to Inventive Example 1, the magnet component oxide powder was subjected to the rare earth oxide separation step as follows: The thus obtained oxide powder of the magnet sludge components was added and mixed with about 4.8 kg of a carbide powder, which was then introduced in the carbothermal reduction furnace 141 where the mixture powder was heated at 1400° C. in an argon gas flow for 2 hours according to the aforementioned carbothermal reduction procedure. By this carbothermal reduction procedure, the oxide powder of the magnet sludge components was converted into a mixture of small lumps of metal iron and small lumps of oxides. The small lumps of metal iron were removed from the mixture, thereby obtaining about 4.8 kg small lumps of rare earth oxides.

A small fragment of the small lumps of rare earth oxides was subjected to the aforementioned X-ray fluorescence quantitative analysis (XRF). The XRF result confirmed that the iron component was almost completely removed similarly to Invention Example 1. The step-by-step composition change in this experiment is shown in Table 5 described later.

Then, the remaining small lumps of rare earth oxides were roughly divided into 4 samples (corresponding to Inventive Examples 9 to 12). For Inventive Example 9 sample, only the powder size optimization step similarly to Inventive Example 6 was performed as the pretreatment process. Inventive Example 9 processed a larger amount of powder per batch than Inventive Example 6. That is, between Inventive Examples 9 and 6, there is a difference in an amount of powder processed per batch. Therefore, the influence of the batch processing capacity can be examined.

The pretreatment process of Inventive Example 10 sample was in most part the same as Inventive Example 9 except that Inventive Example 10 was subjected to the aforementioned boron reduction step (using the alkali carbonate addition/heat treatment procedure) before the grain size optimization step in the pretreatment procedure. The alkali carbonate addition/heat treatment procedure was performed at the boron reduction unit 16 in the rare earth element separation system 200. The alkali carbonate addition/heat treatment procedure involved crushing about 1.2 kg small lumps of rare earth oxides and at the same time mixing the crushed rare earth oxides with about 0.2 kg potassium carbonate ($K_2CO_3$), then heating the mixture at 1450° C. in a nitrogen gas flow for 6 hours. Inventive Example 10 is different from Inventive Example 9 in that Inventive Example 10 was subjected to the boron reduction step. Therefore, the effect of the boron reduction step can be examined.

Inventive Example 11 was in most part the same as Inventive Example 10 except that Inventive Example 11 was subjected to the first and second grain size optimization steps. The first milling step was performed at the first milling machine 1511 in the powder size optimization unit 15'; the second milling step was performed at the second milling machine 1512 in the powder size optimization unit 15'. The first milling machine 1511 used was the same dry ball mill as that of the powder size optimization unit 151 in the rare earth element separation system 100; the second milling machine 1512 used was a wet bead mill. Inventive Example 11 is different from Inventive Example 10 in that Inventive Example 11 has the second milling step. Therefore, the effect of the second milling step can be examined. Note that Inventive Examples 9 and 10 were subjected to only the first milling step performed at the first milling machine 1511.

Inventive Example 12 was subjected to the aforementioned additional oxidation heat treatment step after the powder size optimization step that was the same as that performed in Inventive Example 11. The additional oxidation heat treatment step was performed by heating the milled powder at 1200° C. in an atmosphere for 30 hours at the additional oxidation heat treatment unit 17. Inventive Example 12 is different from Inventive Example 11 in that Inventive Example 12 was subjected to the additional oxidation heat treatment step. Therefore, the effect of the additional oxidation heat treatment step can be examined.

Similarly to Inventive Example 1, the powders of Inventive Examples 9 to 12 after the first milling step and the powders of Inventive Examples 11 and 12 after the second milling step were measured for the particle size distribution using the aforementioned laser diffraction/scattering particle size distribution analyzer (HORIBA, Ltd., LA-950V2). For the powders of Inventive Examples 9 to 12 after the first milling step, the cumulative 50 vol. % particle size was 1.1 to 1.5 μm and the cumulative 90 vol. % particle size was 8 to 9 μm. For the powders of Inventive Examples 11 and 12 after the second milling step, the cumulative 50 vol. % particle size was 0.052 to 0.43 μm and the cumulative 90 vol. % particle size was 0.083 to 1.2 μm.

Meanwhile, an undesirably fine powder having a cumulative 50 vol. % particle size of 0.035 μm was separately prepared by the second milling step. The resulting powder amount yield was below 70% (i.e., the powder amount after the second milling step was less than 70% of the powder amount before the second milling step). This result shows that the cumulative 50 vol. % particle size targeted by the powder size optimization step is preferably 0.04 μm or larger.

The Inventive Examples 9 to 12 powders that were subjected to the above-described different pretreatment processes were next subjected to the FIG. 3 separation process similar to that of Inventive Example 6. Then, each of the separated rare earth compound powders were subjected to the aforementioned X-ray fluorescence quantitative analysis (XRF) similarly to Inventive Example 1. The results are also shown in Table 5.

TABLE 5

Step-by-Step Composition Change of Inventive Examples 9 to 12.

| Element | Sludge Composition (mass %) | Composition after Carbothermal Reduction (mass %) | Composition after Solid-Liquid Separation (mass %) | | | |
|---|---|---|---|---|---|---|
| | | | Inventive Example 9 | Inventive Example 10 | Inventive Example 11 | Inventive Example 12 |
| Fe | 68 | 0.5 | <0.1 | <0.1 | 0.6 | 0.8 |
| Nd | 22.2 | 64.9 | 56.2 | 53.4 | 42 | 39.8 |
| Pr | 4.3 | 17.5 | 15 | 13.6 | 9.6 | 9.7 |

TABLE 5-continued

Step-by-Step Composition Change of Inventive Examples 9 to 12.

| Element | Sludge Composition (mass %) | Composition after Carbothermal Reduction (mass %) | Composition after Solid-Liquid Separation (mass %) | | | |
|---|---|---|---|---|---|---|
| | | | Inventive Example 9 | Inventive Example 10 | Inventive Example 11 | Inventive Example 12 |
| Dy | 3.6 | 13.7 | 21.1 | 25.8 | 32 | 31.9 |
| B | 0.9 | 2.9 | 2.4 | 1.3 | 1.3 | 1.1 |
| Si | 0.5 | 0.2 | 3.3 | 3.9 | 8 | 12.7 |
| Al | 0.5 | 0.3 | 2 | 1.9 | 6.5 | 4 |
| Dy Separation Ratio | 12% | 14% | 23% | 28% | 38% | 39% |

As shown in Table 5, similarly to Inventive Example 1, the iron component contained in the magnet sludge was dramatically reduced by the carbothermal reduction procedure of Inventive Examples 9 to 12. As for the Dy separation ratio, the Dy separation ratio of Inventive Example 9 was 23%, which was about 2 times that of the magnet sludge (the starting magnet powder). However, the Dy separation ratio of Inventive Example 9 was poorer than that of Inventive Example 6. As already described, Inventive Example 9 has a higher processing amount per batch than Inventive Example 6. Probably, the rare earth oxide separation step of the pretreatment process of Inventive Example 9 suffered instability or nonuniformity due to the large processing amount per batch, and as a result the chemical reactions in the simultaneous selective-chlorination/selective-oxychlorination heat treatment step of the separation process could not sufficiently (completely) proceeded compared to Inventive Example 6. That is, it is important for high volume batch processing systems that the rare earth oxides are more completely separated in the pretreatment process.

In Inventive Example 10, the boron reduction step (the alkali carbonate addition/heat treatment procedure) was added to Inventive Example 9. As shown in Table 5, the residual boron concentration can be reduced compared to Inventive Example 9. Also, the Dy separation ratio can be increased compared to Inventive Example 9.

In Inventive Example 11, the second milling step was added to Inventive Example 10. By further reducing the particle size of the rare earth oxide powder by combining the first and second milling steps at the powder size optimization step, the Dy separation ratio can be increased compared to Inventive Example 10 as shown in Table 5. This is probably because the chemical reactions at the simultaneous selective-chlorination/selective-oxychlorination heat treatment step in the separation process can more smoothly (efficiently) proceed.

In Inventive Example 12, the additional oxidation heat treatment step was added to Inventive Example 11. By the effect of the additional oxidation heat treatment step, the Dy separation ratio can be further increased compared to Inventive Example 11 as shown in Table 5. This is probably because the chemical reactions at the simultaneous selective-chlorination/selective-oxychlorination heat treatment step in the separation process can be more completely carried out.

(Rare Earth Element Separation Experiment, Inventive Example 13)

In this experiment (Inventive Example 13), similarly to Inventive Examples 9 to 12, rare earth elements contained in a volume of rare earth (Nd—Fe—B) magnet sludge were separated from each other using a high-volume batch separation system 200 and according to the separation process shown in FIG. 3. The magnet sludge used was the same as that used in Inventive Example 1. Similarly to Inventive Example 1, about 32 kg of water-containing magnet sludge was subjected to the starting powder preparation step and the magnet scrap component oxidation step, thereby obtaining about 13 kg powder of the oxides of the components of the magnet sludge.

Inventive Example 13 was for most part the same as Inventive Example 12 except that the aforementioned reduction/alloying procedure was performed at the boron reduction step. The reduction/alloying procedure was performed in the carbothermal reduction furnace 141 by further heating the reduced iron-containing powder at 1600° C. in an argon gas flow for 10 hours after conducting the carbothermal reduction procedure at 1400° C. in an argon gas flow for 2 hours. The powder after the iron/boron reduction procedure was subjected to the aforementioned XRF quantitative analysis similarly to Inventive Example 1. The result is shown in Table 6 described later.

The Inventive Example 13 that was subjected to the above pretreatment procedure was subjected to the FIG. 3 separation process similar to that used in Inventive Example 6. Then, the separated rare earth compounds of Inventive Example 13 was subjected to the aforementioned X-ray fluorescence quantitative analysis (XRF) similarly to Inventive Example 1. The result is also shown in Table 6.

TABLE 6

Step-by-Step Composition Change of Inventive Example 13.

| Element | Sludge Composition (mass %) | Composition after Boron Reduction (mass %) | Composition after Solid-Liquid Separation (mass %) Inventive Example 13 |
|---|---|---|---|
| Fe | 68 | <0.1 | <0.1 |
| Nd | 22.2 | 67.1 | 43.2 |
| Pr | 4.3 | 18.2 | 10.7 |
| Dy | 3.6 | 14.1 | 36.8 |
| B | 0.9 | 0.2 | 0.1 |
| Si | 0.5 | 0.1 | 6.5 |
| Al | 0.5 | 0.3 | 2.7 |
| Dy Separation Ratio | 12% | 14% | 41% |

As shown in Table 6, even when the rare earth separation amount per batch is increased, the iron and boron components contained in a magnet scarp can be reduced using the reduction/alloying procedure at the boron reduction step. Also, Inventive Example 13 was further improved over Inventive Example 12, and the Dy separation ratio of Inventive Example 13 was 41%, which was about 3.5 times that of the magnet sludge (the starting magnet powder).

As has been described, the separation process in FIG. 3 can also separate the Dy component at a separation ratio of 23% to 41% per one separation process cycle. The Dy recovery yields obtained by the FIG. 3 separation process were 70% to 97%. The above experiment results demonstrate that the rare earth element separation method of the invention can separate/concentrate the Dy from the other rare earth and non-rare earth materials contained in a magnet scrap at a high separation ratio.

The rare earth element separation method of the invention is simple without any need of additional procedures or devices, thus leading to low manufacturing and processing costs.

By using the method of the invention, rare earth elements (such as neodymium/praseodymium and dysprosium) can be extracted from a rare earth magnet scrap (such as a wasted magnet, a failed magnet, magnet sludge) and separated at a high separation ratio and recycled as starting materials for manufacturing rare earth magnets. Therefore, the method of the invention can contribute to effective natural resource use and stable supply of rare earth materials.

The above described embodiments and examples are intended to be illustrative only and in no way limiting. The present invention is not intended to include all features and aspects of the embodiments and examples described above. For example, a part of an example (embodiment) may be substituted for a part of another example (embodiment) or added to another example (embodiment). Also, a part of an example (embodiment) may be removed, or replaced by one or more parts of the other examples (embodiments), or added with one or more parts of the other examples (embodiments).

LEGEND 100, 200, 300 . . . rare earth element separation system;
10, 10', 20 . . . rare earth magnet scrap pretreatment section;
11 . . . magnet scrap storage unit;
12 . . . starting powder preparation unit;
13 . . . magnet scrap component oxidation unit;
14 . . . rare earth oxide separation unit;
141 . . . carbothermal reduction furnace;
142 . . . graphite storage device;
143 . . . pig iron recovery device;
15, 15' . . . powder size optimization unit;
151, 151' . . . powder size optimization device;
1511 . . . first milling machine;
1512 . . . second milling machine;
152 . . . particle size distribution analyzer;
16 . . . boron reduction unit;
17 . . . additional oxidation heat treatment unit;
21 . . . rare earth oxide separation unit;
211 . . . acid dissolution bath;
212 . . . inorganic acid container;
213 . . . impurity recovery container;
214 . . . pH adjustment bath;
215 . . . pH-adjusted solution container;
216 . . . solid-liquid separation bath;
217 . . . precipitant container;
218 . . . rare earth compound oxidation device;
30 . . . rare earth element separation section;
31 . . . chlorinating agent mixing/supply unit;
311 . . . chlorinating agent storage device;
312 . . . hopper;
32 . . . chlorination/oxychlorination heat treatment unit;
33 . . . atmosphere control unit;
331 . . . gas supply device;
332 . . . vacuum evacuation device;
34 . . . waste gas disposal unit;
341 . . . ammonia gas disposal device;
342 . . . hydrogen chloride gas disposal device;
343 . . . chlorine gas disposal device;
35 . . . chemical reaction monitoring unit;
351 . . . ammonia gas sensor;
352 . . . chlorine gas sensor;
40 . . . chloride/oxychloride separation unit;
41 . . . solvent container;
42 . . . dissolution bath;
43 . . . filter;
44 . . . liquid container;
45 . . . solid oxychloride container;
50 . . . rare earth element recovery section;
51 . . . precipitant container;
52 . . . inorganic acid container;
53 . . . impurity recovery container;
54 . . . roasting furnace for first group of rare earth elements;
55 . . . electrolysis furnace for first group of rare earth elements;
56 . . . rare earth metal recovery container for first group of rare earth elements;
57 . . . roasting furnace for second group of rare earth elements;
58 . . . electrolysis furnace for second group of rare earth elements; and
59 . . . rare earth metal recovery container for second group of rare earth elements.

The invention claimed is:

1. A rare earth separation method for separating rare earth elements contained in a magnet wherein said magnet includes as components a first group of rare earth elements and a second group of rare earth elements, comprising the steps of:
(a) a starting powder preparation step of preparing a starting powder from the magnet;
(b) a magnet component oxidation heat treatment step of forming a powder of oxides of the magnet components, the oxides being formed by heating or combustion at a temperature from 300 to 1000° C. in an oxidizing atmosphere;
(c) a rare earth oxide separation step of separating a rare earth oxide powder from the powder of the oxides of the magnet components, the rare earth oxide powder including first group rare earth oxides and second group rare earth oxides;
(d) a powder size optimization step of optimizing the rare earth oxide powder;
(e) a chlorinating agent mixing step of mixing the rare earth oxide powder obtained at the powder size optimization step (d) with a chlorinating agent to prepare a rare earth oxide powder-chlorinating agent mixture;
(f) chlorination/oxychlorination heat treatment step of forming a first group rare earth chlorides-second group rare earth oxychlorides mixture including first group rare earth chlorides and second group rare earth oxychlorides from the rare earth oxide powder-chlorinating agent mixture;

(g) a selective dissolution step of introducing the first group rare earth chlorides-second group rare earth oxychlorides mixture in a solvent in order to selectively dissolve the first group rare earth chlorides in the solvent and leave the second group rare earth oxychlorides undissolved in solid phase form; and (h) a solid-liquid separation step of solid-liquid separating the solvent in which the first group rare earth chlorides are dissolved and the second group rare earth oxychlorides in the solid phase form.

2. The rare earth separation method according to claim 1, wherein the chlorination/oxychlorination heat treatment step includes:

a chlorination heat treatment step of chlorinating all of the rare earth oxide powder in the rare earth oxide powder-chlorinating agent mixture to obtain rare earth chlorides including the first group rare earth chlorides and second group rare earth chlorides; and a selective oxychlorination heat treatment step of oxychlorinating only the second group rare earth chlorides to form the first group rare earth chlorides-second group rare earth oxychlorides mixture, wherein the chlorination heat treatment step is performed at a temperature at which all of the rare earth oxide powder can be chlorinated and lower than vaporization temperatures of the rare earth chlorides in a non-oxidizing atmosphere; and the selective oxychlorination heat treatment step is performed at an optimal temperature in an oxidizing atmosphere.

3. The rare earth separation method according to claim 2, wherein the chlorinating agent is ammonium chloride; and at the optimal temperature of the selective oxychlorination heat treatment step, only the second group rare earth chlorides can be oxychlorinated and the first group rare earth chlorides cannot be oxychlorinated, and the first group rare earth chlorides exhibits a percent weight reduction per unit temperature of $1 \times 10^{-3}\%/°$ C. or less during the selective oxychlorination heat treatment step as measured by thermogravimetric analysis during elevated temperature process.

4. The rare earth separation method according to claim 3, wherein the chlorination heat treatment step includes: a first elementary chlorination step of reacting the rare earth oxide powder with ammonium chloride by a heat treatment at an atmospheric pressure to form ammonium chlorides of the rare earth elements; and a successive second elementary chlorination step of forming the rare earth chlorides from the ammonium chlorides of the rare earth elements by a heat treatment at a reduced pressure.

5. The rare earth separation method according to claim 1, wherein the chlorination/oxychlorination heat treatment step is a simultaneous selective-chlorination/selective-oxychlorination heat treatment step of simultaneously forming the first group rare earth chlorides-second group rare earth oxychlorides from the rare earth oxide powder-chlorinating agent mixture all at once by a heat treatment at an optimal temperature in a non-oxidizing atmosphere.

6. The rare earth separation method according to claim 5, wherein the chlorinating agent is ammonium chloride; and at the optimal temperature of the simultaneous selective-chlorination/selective-oxychlorination heat treatment step, only the first group rare earth oxides can be chlorinated and only the second group rare earth oxides can be oxychlorinated.

7. The rare earth separation method according to claim 6, wherein the simultaneous selective-chlorination/selective-oxychlorination heat treatment step includes: a first step of reacting the first group rare earth oxides with ammonium chloride to form ammonium chlorides of the first group rare earth elements by a heat treatment at an atmospheric pressure; and a successive second step of forming the first group rare earth chlorides from the ammonium chlorides of the first group rare earth elements by a heat treatment at a reduced pressure.

8. The rare earth separation method according to claim 1, wherein the chlorinating agent is ammonium chloride; and the rare earth oxide powder is mixed with the ammonium chloride in a mixing ratio of 1 mole of the rare earth oxide powder relative to more than 6 moles to less than 20 moles of the ammonium chloride.

9. The rare earth separation method according to claim 1, wherein the magnet further includes boron and some of the boron remains in the rare earth oxide powder obtained at the rare earth oxide separation step; and the method further includes, between the rare earth oxide separation step and the powder size optimization step, a boron reduction step of reducing the boron remaining in the rare earth oxide powder.

10. The rare earth separation method according to claim 1 further including, between the powder size optimization step and the chlorinating agent mixing step, an additional oxidation heat treatment step of further and completely oxidizing the rare earth oxide powder obtained at the rare earth oxide separation step, wherein the additional oxidation step is carried out at a temperature higher than the temperature at which the magnet component oxidation heat treatment step is performed in an oxidizing atmosphere.

11. The rare earth separation method according to claim 1, wherein the desirable powder size distribution obtained at the powder size optimization step has a cumulative 50 vol. % powder size of 0.5 µm or larger and a cumulative 90 vol. % powder size of 10 µm or smaller.

12. The rare earth separation method according to claim 1, wherein the desirable powder size distribution obtained at the powder size optimization step has a cumulative 50 vol. % powder size of 0.04 µm or larger and a cumulative 90 vol. % powder size of 1.5 µm or smaller.

13. The rare earth separation method according to claim 12, wherein the powder size optimization step includes a first milling step of providing a first desirable powder size distribution and a successive second milling step of providing a second desirable powder size distribution, and wherein the first desirable powder size distribution obtained at the first milling step has a cumulative 50 vol. % powder size of 0.5 µm or larger and a cumulative 90 vol. % powder size of 10 µm or smaller, and the second desirable powder size distribution obtained at the second milling step has a cumulative 50 vol. % powder size of 0.04 µm or larger and a cumulative 90 vol. % powder size of 1.5 µm or smaller.

14. The rare earth separation method according to claim 1, wherein the rare earth oxide separation step is carried out by a carbothermal reduction process or a selective acid dissolution process.

15. The rare earth separation method according to claim 1, wherein the magnet is a neodymium-iron-boron system magnet, the first group of rare earth elements is neodymium and/or praseodymium, and the second group of rare earth elements is dysprosium.

16. A rare earth separation system for separating rare earth elements contained in a magnet wherein said magnet includes as components a first group of rare earth elements and a second group of rare earth elements, the system comprising:
  a magnet pretreatment section including:
    a magnet component oxidation heat treatment unit;
    a rare earth oxide separation unit connected with the magnet component oxidation heat treatment unit; and
    a powder size optimization unit connected with the rare earth oxide separation unit; and
  a rare earth element separation section including:
    a chlorinating agent mixing/supply unit;
    a chlorination/oxychlorination heat treatment unit;
    an atmosphere control unit;
    a waste gas disposal unit; and
    a chloride/oxychloride separation unit, the chlorinating agent mixing/supply unit being connected with the powder size optimization unit and the chlorination/oxychlorination heat treatment unit, the chlorination/oxychlorination heat treatment unit being connected with the chlorinating agent mixing/supply unit, the atmosphere control unit, the waste gas disposal unit and the chloride/oxychloride separation unit,
  wherein the magnet component oxidation heat treatment unit forms a powder of the magnet components and oxides the powder to prepare a magnet component oxide powder,
  wherein the rare earth oxide separation unit separates a rare earth oxide powder containing rare earth oxides including first group rare earth oxides and second group rare earth oxides from the magnet component oxide powder obtained at the magnet component oxidation heat treatment unit,
  wherein the powder size optimization unit optimizes the rare earth oxide powder so as to have a desirable powder size distribution,
  wherein the chlorinating agent mixing/supply unit mixes the rare earth oxide powder whose powder size is optimized at the powder size optimization unit with a chlorinating agent to prepare a rare earth oxide powder-chlorinating agent mixture and supplies the mixture to the chlorination/oxychlorination heat treatment unit,
  wherein the chlorination/oxychlorination heat treatment unit performs two types of chlorination/oxychlorination heat treatments:
  1) a chlorination/selective-oxychlorination heat treatment including a chlorination heat treatment of firstly chlorinating all the rare earth oxide powder in the rare earth oxide powder-chlorinating agent mixture to obtain rare earth chlorides including first group rare earth chlorides and second group rare earth chlorides, and a selective oxychlorination heat treatment of, successively after the chlorination heat treatment, selectively oxychlorinates only the second group rare earth chlorides to prepare a first group rare earth chlorides-second group rare earth oxychlorides mixture; or
  2) a simultaneous selective-chlorination/selective-oxychlorination heat treatment of simultaneously forming the first group rare earth chlorides-second group rare earth oxychlorides from the rare earth oxide powder-chlorinating agent mixture all at once,
  wherein the chlorination heat treatment in the chlorination/selective-oxychlorination heat treatment is performed at a temperature at which all of the rare earth oxide powder can be chlorinated to form the rare earth chlorides and lower than vaporization temperatures of the rare earth chlorides in a non-oxidizing atmosphere and the selective-oxychlorination heat treatment in the chlorination/selective-oxychlorination heat treatment is performed at an optimal temperature in an oxidizing atmosphere,
  wherein the simultaneous selective-chlorination/selective-oxychlorination heat treatment is performed at a temperature at which only the first group rare earth oxides can be chlorinated and only the second group rare earth oxides can be oxychlorinated,
  wherein the atmosphere control unit controls the non-oxidizing atmosphere used in the chlorinating heat treatment, the oxidizing atmosphere used in the selective-oxychlorinating heat treatment, and the non-oxidizing atmosphere used in the simultaneous selective-chlorination/selective-oxychlorination heat treatment,
  wherein the waste gas disposal unit disposes ammonia gas and hydrogen chloride gas generated by the chlorination heat treatment, chlorine gas generated by the selective-oxychlorination heat treatment, and ammonia gas generated by the simultaneous selective-chlorination/selective-oxychlorination heat treatment,
  and wherein the chloride/oxychloride separation unit firstly introduces the first group rare earth chlorides-second group rare earth oxychlorides mixture in a solvent in order to selectively dissolve the first group rare earth chlorides in the solvent and leave the second group rare earth oxychlorides undissolved in solid phase form; and then solid-liquid separates the solvent in which the first group rare earth chlorides are dissolved and the second group rare earth oxychlorides are in solid phase form.

17. A rare earth separation system for separating rare earth elements contained in a magnet wherein said magnet includes as components a first group of rare earth elements, a second group of rare earth elements and boron, the system comprising:
  a magnet pretreatment section including:
    a magnet component oxidation heat treatment unit;
    a rare earth oxide separation unit;
    a boron reduction unit;
    a powder size optimization unit; and
    an additional oxidation heat treatment unit, the rare earth oxide separation unit being connected with the magnet component oxidation heat treatment unit and the boron reduction unit, the powder size optimization unit being connected with the boron reduction unit and the additional oxidation heat treatment unit; and
  a rare earth element separation section including:
    a chlorinating agent mixing/supply unit;
    a chlorination/oxychlorination heat treatment unit;
    an atmosphere control unit;
    a waste gas disposal unit; and
    a chloride/oxychloride separation unit, the chlorinating agent mixing/supply unit being connected with the additional oxidation heat treatment unit and the chlorination/oxychlorination heat treatment unit, the chlorination/oxychlorination heat treatment unit being connected with the atmosphere control unit, the waste gas disposal unit and the chloride/oxychloride separation unit,
  wherein the magnet component oxidation heat treatment unit forms a powder of the magnet components and oxides the powder to prepare a magnet component oxide powder,
  wherein the rare earth oxide separation unit separates a rare earth oxide powder containing rare earth oxides including first group rare earth oxides and second group rare earth oxides from the magnet component oxide powder obtained at the magnet component oxidation heat treatment unit, wherein the boron reduction unit reduces boron remaining in the rare earth oxide powder separated at the rare earth oxide separation unit, wherein the powder size optimization unit optimizes the rare earth oxide powder so as to have a desirable powder size distribution, wherein the additional oxidation heat treatment unit further and completely oxidizes the rare earth oxide powder whose powder size is optimized at the powder size optimization unit, wherein the chlorinating agent mixing/supply unit mixes the rare earth oxide powder that is further oxidized at the additional oxidation heat treatment unit with a chlorinating agent to prepare a rare earth oxide powder-chlorinating agent mixture and supplies the mixture to the chlorination/oxychlorination heat treatment unit, wherein the chlorination/oxychlorination heat treatment unit performs two types of chlorination/oxychlorination heat treatments:

1) a chlorination/selective-oxychlorination heat treatment including a chlorination heat treatment of first chlorinating all the rare earth oxide powder in the rare earth oxide powder-chlorinating agent mixture to obtain rare earth chlorides including first group rare earth chlorides and second group rare earth chlorides, and a selective oxychlorination heat treatment of, successively after the chlorination heat treatment, selectively oxychlorinating only the second group rare earth chlorides to prepare a first group rare earth chlorides-second group rare earth oxychlorides mixture; or 2) a simultaneous selective-chlorination/selective-oxychlorination heat treatment of simultaneously forming the first group rare earth chlorides-second group rare earth oxychlorides from the rare earth oxide powder-chlorinating agent mixture all at once, wherein the chlorination heat treatment in the chlorination/selective-oxychlorination heat treatment is performed at a temperature at which all of the rare earth oxide powder can be chlorinated to form the rare earth chlorides and lower than vaporization temperatures of the rare earth chlorides in a non-oxidizing atmosphere and the selective-oxychlorination heat treatment in the chlorination/selective-oxychlorination heat treatment is performed at an optimal temperature in an oxidizing atmosphere, wherein the simultaneous selective-chlorination/selective-oxychlorination heat treatment is performed at a temperature at which only the first group rare earth oxides can be chlorinated and only the second group rare earth oxides can be oxychlorinated, wherein the atmosphere control unit controls the non-oxidizing atmosphere used in the chlorinating heat treatment, the oxidizing atmosphere used in the selective-oxychlorinating heat treatment, and the non-oxidizing atmosphere used in the simultaneous selective-chlorination/selective-oxychlorination heat treatment, wherein the waste gas disposal unit disposes ammonia gas and hydrogen chloride gas generated by the chlorination heat treatment, chlorine gas generated by the selective-oxychlorination heat treatment, and ammonia gas generated by the simultaneous selective-chlorination/selective-oxychlorination heat treatment, and wherein the chloride/oxychloride separation unit first introduces the first group rare earth chlorides-second group rare earth oxychlorides mixture in a solvent in order to selectively dissolve the first group rare earth chlorides in the solvent and leave the second group rare earth oxychlorides undissolved in solid phase form; and then solid-liquid separates the solvent in which the first group rare earth chlorides are dissolved and the second group rare earth oxychlorides are in solid phase form.

18. The rare earth separation system according to claim 16, wherein: the chlorinating agent is ammonium chloride; the chlorination heat treatment includes a first elementary chlorination heat treatment of reacting the rare earth oxide powder with the ammonium chloride to form ammonium chlorides of the first group of rare earth elements by a heat treatment at an atmospheric pressure controlled by the atmosphere control unit and a successive second elementary chlorination heat treatment of forming the first group rare earth chlorides from the ammonium chlorides of the first group of rare earth elements by a heat treatment at a reduced pressure controlled by the atmosphere control unit; and the oxidizing atmosphere controlled by the atmosphere control unit used in the selective-oxychlorinating heat treatment is an atmosphere, a dry air, or an inert gas/oxygen gas mixture.

19. The rare earth separation system according to claim 16, wherein at the optimal temperature of the selective oxychlorination heat treatment, only the second group rare earth chlorides can be oxychlorinated and the first group rare earth chlorides cannot be oxychlorinated, and the first group rare earth chlorides exhibits a percent weight reduction per unit temperature of $1\times10^{-3}\%/^\circ$ C. or less during the selective oxychlorination heat treatment as measured by thermogravimetric analysis during elevated temperature process.

20. The rare earth separation system according to claim 16, wherein the chlorinating agent is ammonium chloride; and the simultaneous selective-chlorination/selective-oxychlorination heat treatment includes a first heat treatment of reacting the rare earth oxide powder with the ammonium chloride to form ammonium chlorides of the first group of rare earth elements by a heat treatment at an atmospheric pressure controlled by the atmosphere control unit and a successive second heat treatment of forming the first group rare earth chlorides from the ammonium chlorides of the first group of rare earth elements by heat treatment at a reduced pressure controlled by the atmosphere control unit.

21. The rare earth separation system according to claim 16, wherein the rare earth element separation section further includes, connected between the chlorination/oxychlorination heat treatment unit and the waste gas disposal unit, a chemical reaction monitoring unit including an ammonia gas sensor.

22. The rare earth separation system according to claim 16, wherein the rare earth element separation section further includes, connected between the chlorination/oxychlorination heat treatment unit and the waste gas disposal unit, a chemical reaction monitoring unit including an ammonia gas sensor for monitoring the chemical reactions performed at the chlorination heat treatment and a chlorine gas sensor for monitoring chemical reactions performed at the selective oxychlorination heat treatment.

23. The rare earth separation system according to claim 16, wherein:
the powder size optimization unit includes an agglomerating device and/or a milling device, and further includes a particle size distribution analyzer;

the milling device includes a first milling machine for providing a first desirable powder size distribution and a second milling machine for providing a second desirable powder size distribution;

a cumulative 50 vol. % powder size and a cumulative 90 vol. % powder size of the first desirable powder size distribution obtained by the first milling machine are 0.5 µm or larger and 10 µm or smaller, respectively; and a cumulative 50 vol. % powder size and a cumulative 90 vol. % powder size of the second desirable powder size distribution obtained by the second milling machine are 0.04 µm or larger and 1.5 µm or smaller, respectively.

24. The rare earth separation system according to claim 16, wherein the rare earth oxide separation unit includes devices for performing a carbothermal reduction process or devices for performing a selective acid dissolution process.

25. The rare earth separation system according to claim 16, wherein the magnet is a neodymium-iron-boron system magnet, the first group of rare earth elements is neodymium and/or praseodymium, and the second group of rare earth elements is dysprosium.

26. The rare earth separation system according to claim 17, wherein the chlorinating agent is ammonium chloride;

the chlorination heat treatment includes a first elementary chlorination heat treatment of reacting the rare earth oxide powder with the ammonium chloride to form ammonium chlorides of the first group of rare earth elements by a heat treatment at an atmospheric pressure controlled by the atmosphere control unit and a successive second elementary chlorination heat treatment of forming the first group rare earth chlorides from the ammonium chlorides of the first group of rare earth elements by a heat treatment at a reduced pressure controlled by the atmosphere control unit; and the oxidizing atmosphere controlled by the atmosphere control unit used in the selective-oxychlorinating heat treatment is an atmosphere, a dry air, or an inert gas/oxygen gas mixture.

27. The rare earth separation system according to claim 17, wherein at the optimal temperature of the selective oxychlorination heat treatment, only the second group rare earth chlorides can be oxychlorinated and the first group rare earth chlorides cannot be oxychlorinated, and the first group rare earth chlorides exhibits a percent weight reduction per unit temperature of $1 \times 10^{-3}$%/° C. or less during the selective oxychlorination heat treatment as measured by thermogravimetric analysis during elevated temperature process.

28. The rare earth separation system according to claim 17, wherein the chlorinating agent is ammonium chloride; and the simultaneous selective-chlorination/selective-oxychlorination heat treatment includes a first heat treatment of reacting the rare earth oxide powder with the ammonium chloride to form ammonium chlorides of the first group of rare earth elements by a heat treatment at an atmospheric pressure controlled by the atmosphere control unit and a successive second heat treatment of forming the first group rare earth chlorides from the ammonium chlorides of the first group of rare earth elements by heat treatment at a reduced pressure controlled by the atmosphere control unit.

29. The rare earth separation system according to claim 17, wherein the rare earth element separation section further includes, connected between the chlorination/oxychlorination heat treatment unit and the waste gas disposal unit, a chemical reaction monitoring unit including an ammonia gas sensor.

30. The rare earth separation system according to claim 17, wherein the rare earth element separation section further includes, connected between the chlorination/oxychlorination heat treatment unit and the waste gas disposal unit, a chemical reaction monitoring unit including an ammonia gas sensor for monitoring the chemical reactions performed at the chlorination heat treatment and a chlorine gas sensor for monitoring chemical reactions performed at the selective oxychlorination heat treatment.

31. The rare earth separation system according to claim 17, wherein:

the powder size optimization unit includes an agglomerating device and/or a milling device, and further includes a particle size distribution analyzer;

the milling device includes a first milling machine for providing a first desirable powder size distribution and a second milling machine for providing a second desirable powder size distribution;

a cumulative 50 vol. % powder size and a cumulative 90 vol. % powder size of the first desirable powder size distribution obtained by the first milling machine are 0.5 µm or larger and 10 µm or smaller, respectively; and a cumulative 50 vol. % powder size and a cumulative 90 vol. % powder size of the second desirable powder size distribution obtained by the second milling machine are 0.04 µm or larger and 1.5 µm or smaller, respectively.

32. The rare earth separation system according to claim 17, wherein the rare earth oxide separation unit includes devices for performing a carbothermal reduction process or devices for performing a selective acid dissolution process.

33. The rare earth separation system according to claim 17, wherein the magnet is a neodymium-iron-boron system magnet, the first group of rare earth elements is neodymium and/or praseodymium, and the second group of rare earth elements is dysprosium.

* * * * *